US008180103B2

(12) United States Patent
Kitaura et al.

(10) Patent No.: US 8,180,103 B2
(45) Date of Patent: May 15, 2012

(54) IMAGE DETERMINING METHOD, IMAGE DETERMINING APPARATUS, AND RECORDING MEDIUM HAVING RECORDED THEREIN PROGRAM FOR CAUSING COMPUTER TO EXECUTE IMAGE DETERMINING METHOD

(75) Inventors: Asako Kitaura, Kawasaki (JP); Seiya Shimizu, Kawasaki (JP); Motoo Masui, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1101 days.

(21) Appl. No.: 12/007,327

(22) Filed: Jan. 9, 2008

(65) Prior Publication Data

US 2008/0112646 A1    May 15, 2008

Related U.S. Application Data

(63) Continuation of application No. PCT/JP2005/013261, filed on Jul. 19, 2005.

(51) Int. Cl.
*G06K 9/36* (2006.01)
(52) U.S. Cl. ......... 382/103; 362/113; 362/154; 362/291
(58) Field of Classification Search ............ None
See application file for complete search history.

(56) References Cited

U.S. PATENT DOCUMENTS

| 5,864,632 | A | | 1/1999 | Ogawa et al. | |
|---|---|---|---|---|---|
| 6,167,142 | A | * | 12/2000 | Nozaki | 382/103 |
| 6,346,941 | B1 | * | 2/2002 | Arita et al. | 345/427 |
| 6,354,944 | B1 | * | 3/2002 | Takahashi et al. | 463/32 |
| 2003/0074373 | A1 | | 4/2003 | Kaburagi et al. | |
| 2005/0031196 | A1 | * | 2/2005 | Moghaddam et al. | 382/154 |

FOREIGN PATENT DOCUMENTS

| EP | 0 786 742 A1 | 7/1997 |
|---|---|---|
| JP | 06348815 | 12/1994 |
| JP | 09101742 | 4/1997 |
| JP | 11-066350 | 3/1999 |
| JP | 11339074 | 12/1999 |
| JP | 2000-101905 | 4/2000 |
| JP | 2000-113209 | 4/2000 |
| JP | 2000-348217 | 12/2000 |
| JP | 2001-034250 | 2/2001 |
| JP | 2001-290820 | 10/2001 |

(Continued)

OTHER PUBLICATIONS

English translation of the Japanese Office Action dated Jul. 13, 2010, issued in corresponding JP patent application No. 2007-525463.
Notice of Rejection dated Oct. 12, 2010 received in corresponding Japanese Patent Application No. 2007-525463.

(Continued)

*Primary Examiner* — Brian P Werner
(74) *Attorney, Agent, or Firm* — Murphy & King, P.C.

(57) ABSTRACT

In an image determining apparatus, a subject-shape presuming unit extracts a shape of a specified subject to be determined based on subject-area position information and structure/surface-height map information, a subject-feature-point extracting unit extracts a feature point based on the shape of the subject to be determined. Further, an otherobject-influence determining unit generates number information based on camera data, the feature point, and the height of a group of surrounding objects, an other-object-influence index calculator calculates an other-object-influence index based on the number information, and a display processor displays video picture data based on the other-object-influence index on a display device.

10 Claims, 21 Drawing Sheets

FOREIGN PATENT DOCUMENTS

| | | |
|---|---|---|
| JP | 2002-152637 | 5/2002 |
| JP | 2002-358522 | 12/2002 |
| JP | 2003-87442 | 3/2003 |
| JP | 2003-179908 | 6/2003 |

OTHER PUBLICATIONS

Fujio Yamaguchi, "Image Processing Technology Through Computer Display", Nikkan Kogyo Shinbunsha, Jul. 30, 1981, p. 246-252.

* cited by examiner

AREA OF SUBJECT

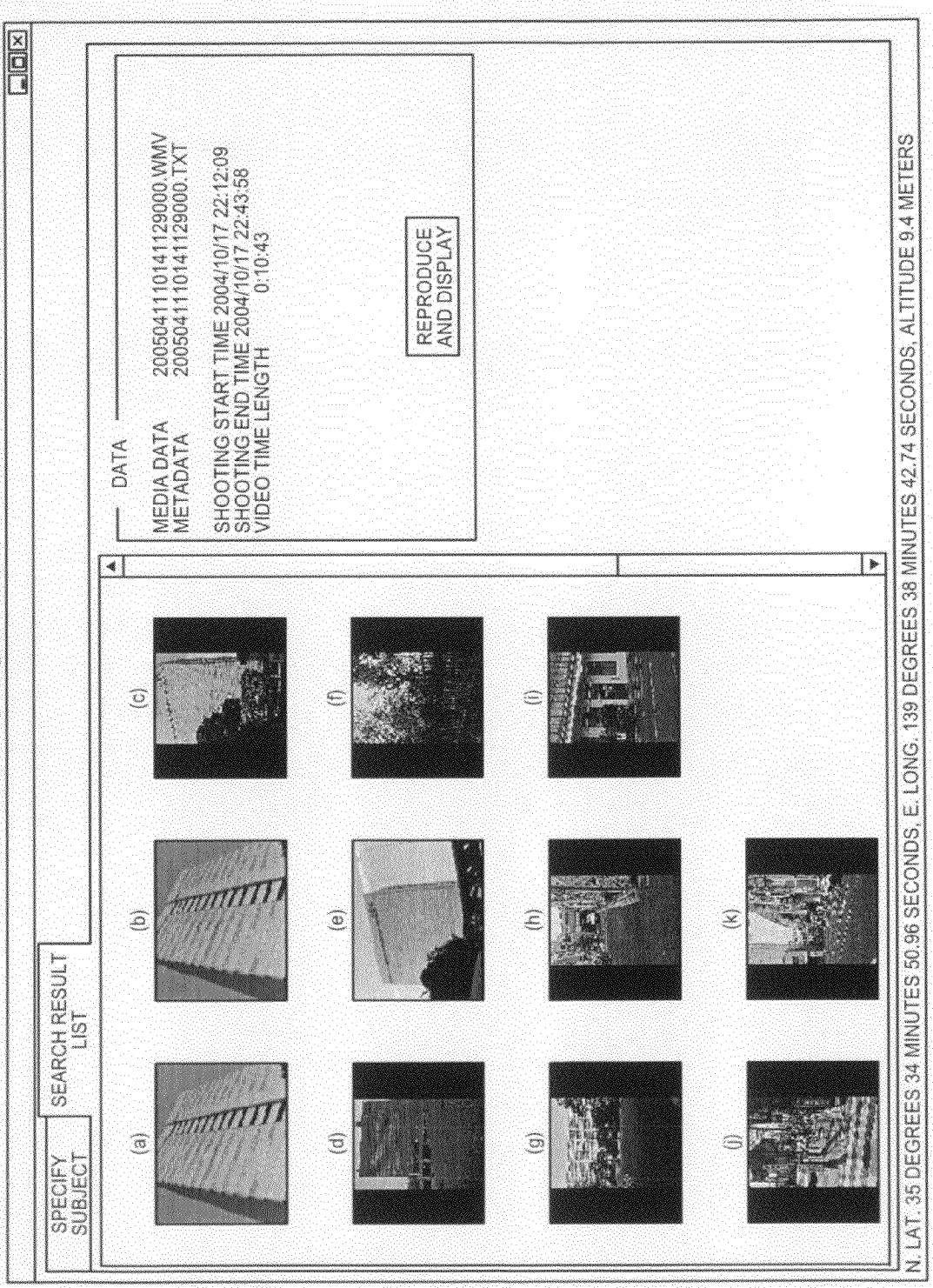

FIG.21

HEIGHT-MAP CORRECTION INFORMATION
310a

| ID | TYPE | ESTIMATED TIME OF CHANGE (MIN) | ESTIMATED TIME OF CHANGE (MAX) | ESTI-MATED SHAPE ID | MBR (MIN) LATITUDE AND LONGITUDE | MBR (MAX) LATITUDE AND LONGITUDE | ASSIGNED THREE-DIMEN-SIONAL MESH ID |
|---|---|---|---|---|---|---|---|
| 111 | DISAP-PEARED | 2004.5.20, 11:05:02 | 2005.1.20, 18:21:40 | 511 | 139.412981 35.411165 | 139.413028 35.411165 | 53391224 |
| 112 | DISAP-PEARED | 2004.5.20, 11:05:02 | 2005.1.20, 18:21:40 | 213 | 138.214111 35.371981 | 138.218111 35.371991 | 53393411 |
| 113 | GEN-ERATED | 2004.5.20, 11:05:02 | 2005.1.20, 18:21:40 | 214 | 139.352187 35.112984 | 139.352587 35.112284 | 53392124 |
| 114 | GEN-ERATED | 2004.5.20, 11:05:02 | 2005.1.20, 18:21:40 | 26 | 139.224719 25.617714 | 139.224819 25.617914 | 53392586 |
| ... | ... | ... | ... | ... | ... | ... | ... |

CORRECTED-AREA TABLE

| ID | ESTIMATED HEIGHT (MAX) | ESTIMATED HEIGHT (MIN) | NUMBER OF VERTEXES OF PROJECTED SHAPE | VERTEX ID GROUP OF PROJECTED SHAPE |
|---|---|---|---|---|
| 213 | - | 12.65 | 12 | 9889,1245,732,186,..... |
| 214 | 30.88 | - | 58 | 1114,1115,121,387,.... |
| 215 | - | 8.05 | 31 | 35,5655,1289,38,... |
| 216 | 21.42 | - | 8 | 7123,686,509,510,.... |
| ... | ... | ... | ... | ... |

CORRECTED-AREA SHAPE TABLE

| ID | ESTIMATED HEIGHT (MAX) | ESTIMATED HEIGHT (MIN) |
|---|---|---|
| 67 | 139.416787 | 35.411809 |
| 68 | 139.416766 | 35.411768 |
| 69 | 139.416767 | 35.411733 |
| ... | ... | ... |

CORRECTED-AREA VERTEX TABLE

IMAGE DETERMINING METHOD, IMAGE DETERMINING APPARATUS, AND RECORDING MEDIUM HAVING RECORDED THEREIN PROGRAM FOR CAUSING COMPUTER TO EXECUTE IMAGE DETERMINING METHOD

CROSS-REFERENCE TO RELATED APPLICATIONS

This is a continuation application of International Application Number PCT/JP2005/013261, which was filed on Jul. 19, 2005.

BACKGROUND OF THE INVENTION

1. Field of the Invention

The present invention relates to an image determining method and the like that determine a pictured status of a predetermined subject in video and an image shot by a camera, and, more particularly relates to an image determining method and an image determining apparatus capable of selecting optimum video data and image data even when there is other structures between a camera and a subject by taking the structures into consideration, and a recording medium having recorded therein a program for causing a computer to execute the image determining method.

2. Description of the Related Art

Conventionally, when a user of video data of a predetermined subject (hereinafter, simply "user") wants to obtain video data and an image of the subject, the user shoots the subject from various directions by using a plurality of cameras set at different positions, views and selects optimum data, that is, data of the best pictured status of the subject from the group of shot video data pieces and images by the user himself, and uses the selected video and image data.

However, according to the above method, if the number of pieces of video data and image data of the subject shot by the cameras increases, the user needs to view and check the video and image data one by one and select an optimum image frame of the video data and optimum image data (hereinafter, simply "image") by the user himself. Therefore, there is a problem that a burden on the user is heavy.

To reduce the burden on the user, therefore, a technique enabling automatic selection of an optimum piece of video and image data, using a camera position and direction and the position of the subject, based on a shooting space and the position of the subject is disclosed (for example, see Japanese Patent Application Laid-open No. 2001-34250 and Japanese Patent Application Laid-open No. 2003-179908). According to this technique, as shown in FIG. 22, a shooting space of the image shot by the camera A is defined as an elliptic-cone or quadrangular-pyramid space which outspreads from the position of the camera A, i.e., the vertex, centering on the shooting direction, so as to cover the camera's angle of view calculated based on a focal length. Subjects A and B in the shooting space are determined to appear in the image, and subject C out of the space is determined not.

As a method for determining the pictured status of the video and image, a distance from the camera A is respectively calculated relative to the subjects A and B, which have been determined to appear in the image of the camera A, and the subject B closer to the camera A than the subject A is determined to be well-pictured and the subject A is determined not to be well-pictured.

As another method for determining the pictured status of the video and image, there is a method in which among the subjects A and B present in the shooting space of the camera, subject A particularly close to the central axis of the elliptic cone or the quadrangular pyramid of the shooting space is determined to be well-pictured.

However, in the above conventional technique, there is a problem that the optimum video and image data cannot be always selected.

Because, as shown in FIG. 23, when there is a group of other structures respectively between the camera A and the subjects A and B, the subjects A and B are hidden by the group of other structures, and the camera A cannot shoot the subjects A and B appropriately. The conventional method, however, still erroneously selects the image shot by the camera A as the optimum image data with respect to the subjects A and B.

The erroneous selection also occurs in the method for determining the pictured status of the subject. Thus, the conventional technique cannot appropriately select the optimum data because it does not take into consideration other structures present between the camera and the subject.

Thus, it is important to allow for an automatic selection of the optimum image data, taking other structure or the like into consideration, even when there is other structure or the like between the camera and the subject.

SUMMARY OF THE INVENTION

It is an object of the present invention to at least partially solve the problems in the conventional technology.

According to one aspect of the present invention, an image determining method for determining a pictured status of a predetermined subject in an image shot by a camera, includes extracting a feature point characterizing a position of the subject based on information on an area where the subject is present, and determining the pictured status of the predetermined subject by determining whether an object is the predetermined subject or not based on a position of the feature point of the predetermined subject extracted in the extracting and a position of the object present between the feature point and the camera.

According to another aspect of the present invention, an image determining apparatus for determining a pictured status of a predetermined subject in an image shot by a camera, includes an extracting unit that extracts a feature point characterizing a position of the subject based on information on an area where the subject is present, and a determining unit that determines the pictured status of the predetermined subject by determining whether an object is the predetermined subject or not based on a position of the feature point of the predetermined subject extracted by the extracting unit and a position of the object present between the feature point and the camera.

According to still another aspect of the present invention, a computer-readable recording medium that stores therein a computer program for determining a pictured status of a predetermined subject in an image shot by a camera, the computer program causing a computer to execute extracting a feature point characterizing a position of the subject based on information on an area where the subject is present, and determining the pictured status of the predetermined subject by determining whether an object is the predetermined subject or not based on a position of the feature point of the predetermined subject extracted in the extracting and a position of the object present between the feature point and the camera.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is an example of an interface by which a display processor uses an other-object-influence index to display video and image data;

FIG. 21 is an example of a data structure of height-map correction information;

DETAILED DESCRIPTION OF THE PREFERRED EMBODIMENTS

Exemplary embodiments of an image determining method, an image determining apparatus, and a recording medium having recorded therein a program for causing a computer to execute the image determining method according to the present invention will be explained below in detail with reference to the accompanying drawings.

First Embodiment

Figure 1:
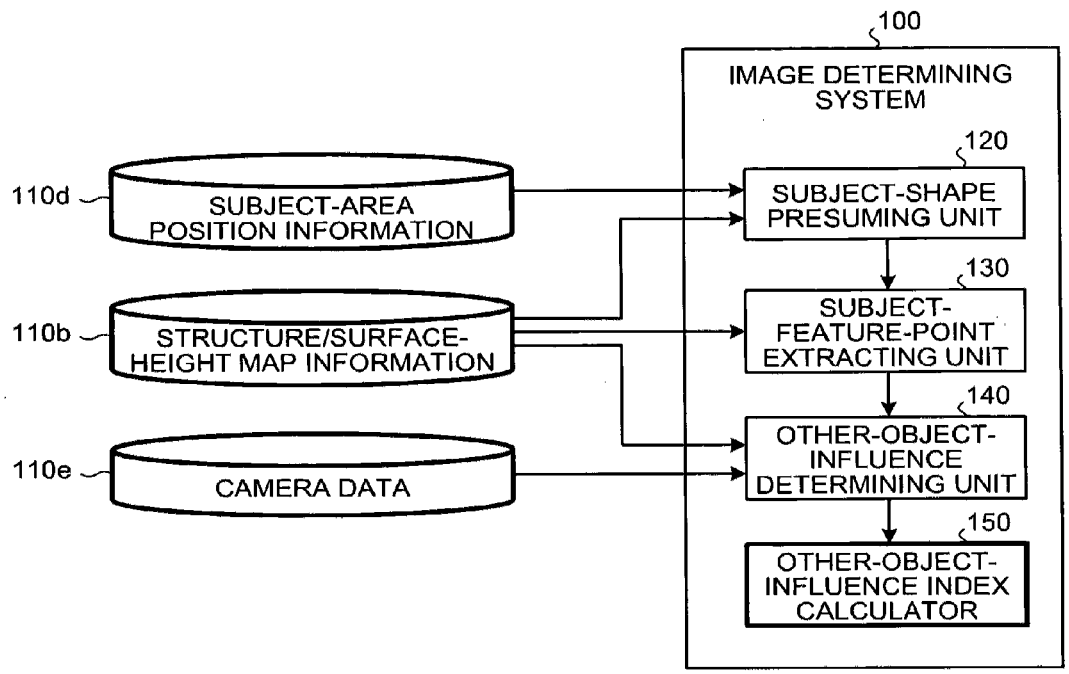
FIG. 1 depicts a principle of an image determining system according to the present invention.

The principle of an image determining system according to the present invention is explained first. FIG. 1 depicts a principle of the image determining system according to the present invention. FIG. 1 shows a configuration of an image determining system 100 which calculates a pictured status as an other-object-influence index which indicates how a subject in video and image (hereinafter, "subject to be determined") is hidden by other object(s). FIG. 1 also shows data used by the image determining system 100.

The image determining system 100 includes a subject-shape presuming unit 120 and a subject-feature-point extracting unit 130 that mainly perform a process on the subject to be determined as a preprocessing for starting determination of a pictured status affected by other object appears in the video and the image. The image determining system 100 also includes an other-object-influence determining unit 140 and an other-object-influence index calculator 150 that performs a process of the pictured status determination itself on the respective image frames of the video and the image using the preprocessing result. The data used in the process includes subject-area position information 110d, which is data relating to the subject to be determined to which the image determining system 100 is applied, camera data 110e relating to a camera which shoots the video and the image, and structure/surface-height map information 110b used for the preprocessing as well as the main processing of the system.

The subject-area position information 110d is position information of an area where the subject to be determined is present (hereinafter referred to as "area of presence"). The area of presence can be a dot, ellipse, rectangle, polygon, and the like. For example, when the area of presence is a polygon, the subject-area position information 110d includes values of a position coordinate such as latitude and longitude of each vertex of the shape of the area of presence, and structural information (topology) required for forming the polygon from the respective vertexes, and the like. The area of presence is used for specifying an area occupied by the subject to be determined on each map.

Figure 2:
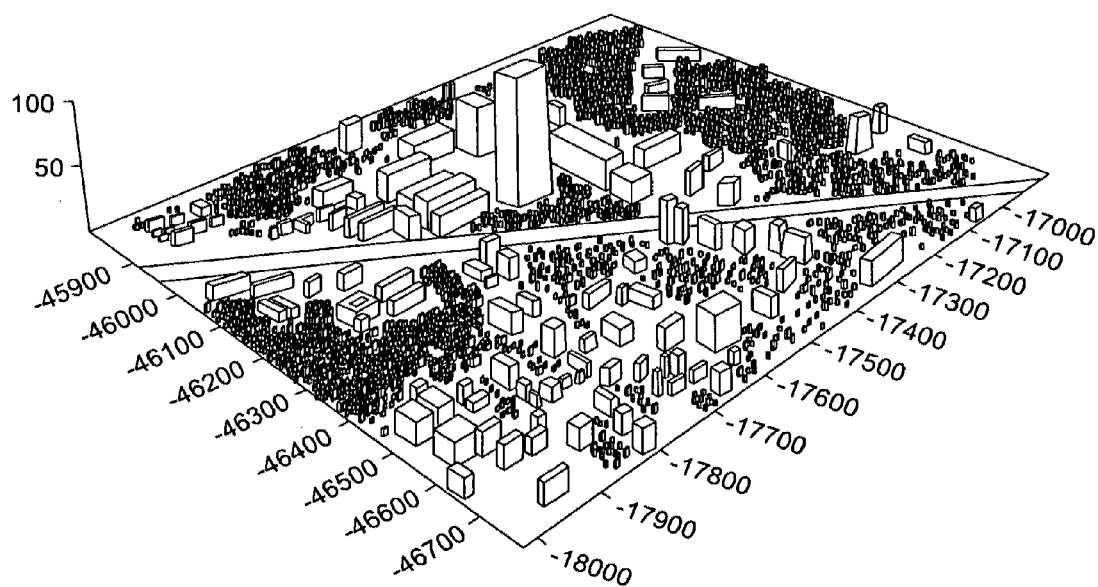
FIG. 2 is an example of structure/surface-height map information.

The structure/surface-height map information 110b is information in which various pieces of height information such as the height of a man-made construction and a natural object such as a tree (hereinafter, "structure"), and the height of a pure surface excluding the structure are mapped together with the measurement positions thereof. A specific example on how the map information is held is explained in detail in a first embodiment and onward of the present invention. These various heights can be held separately, or a sum thereof can be held. Here, the information is referred to as a map because various types of heights can be obtained based on the position information. However, the structure/surface-height map information may be held as a table list when it is actually implemented in the apparatus. FIG. 2 is an example of the structure/surface-height map information 110b.

The camera data 110e is information of a camera which shoots respective image frames of the video and the image, to which the present invention is applied, and includes camera parameters such as a camera position, shooting direction, and focal length, and information such as an angle of view calculated from the camera parameters. In the present invention, the respective image frames of the video and the image are not directly used for the determination, but the camera data 110e associated therewith is used for image determination. The video data corresponding to the camera data 110e having a good determination result is eventually selected as the optimum video data of the subject to be determined.

The subject-shape presuming unit 120 compares the subject-area position information 110d with the structure/surface-height map information 110b to obtain the height of the area of presence of the subject to be determined, thereby presuming the shape of the subject. The method of extracting the rough shape of the subject to be determined is not limited thereto. For example, the rough shape of the subject to be determined can be extracted with the use of detailed three dimensional data such as computer aided design (CAD).

The subject-feature-point extracting unit 130 calculates the position and the height of a feature point representing the subject to be determined based on the shape presumed by the subject-shape presuming unit 120. The subject-feature-point extracting unit 130 can employ any manner of calculation as far as the obtained feature point represents the position and the shape of the subject to be determined. For example, it is possible to divide the shape into meshes of arbitrary width to use a mesh lattice point, or to obtain the feature point at random from the shape, or to set the feature point on a point of center of gravity of the shape, as described in the first embodiment.

The other-object-influence determining unit 140 obtains the height information from the structure/surface-height map information 110b corresponding to each point on a line segment connecting the feature point extracted by the subject-feature-point extracting unit 130 and the camera position, which is the camera data 110e. The other-object-influence determining unit 140 then compares the obtained height with the height of the line segment to detect if there is an object that goes beyond the line segment. The other-object-influence determining unit 140 determines whether there is a point on which an object is detected within the area of presence of the subject to be determined based on the subject-area position information 110d, thereby determining whether the detected object is the subject to be determined or not, in other words, whether the detected object is an object other than the subject to be determined or not. When there is no object that goes beyond the line segment at any points of the line segment, the other-object-influence determining unit 140 determines that the feature point is not hidden at all. Through this process of determination, the other-object-influence determining unit 140 classifies the feature points into three types, that is, those hidden by other object, those hidden by the subject to be determined itself, and those not hidden.

The other-object-influence index calculator 150 calculates an index value which indicates the pictured status of the subject to be determined in the video and the image corresponding to the pertinent camera using the result of determination and classification of each feature point obtained by the other-object-influence determining unit 140. The pictured status is affected by any object hiding the subject to be determined.

Thus, the image determining system 100 extracts the feature points of the subject to be determined, and estimates how many feature points are hidden by other objects when seen from the camera based on the extracted feature points and the height of the other objects, to thereby determine the pictured status of the subject to be determined in the image. Therefore, the user can efficiently select the optimum video and image data from the plural pieces of video and image data shot by the cameras based on the determination result.

Figure 3:
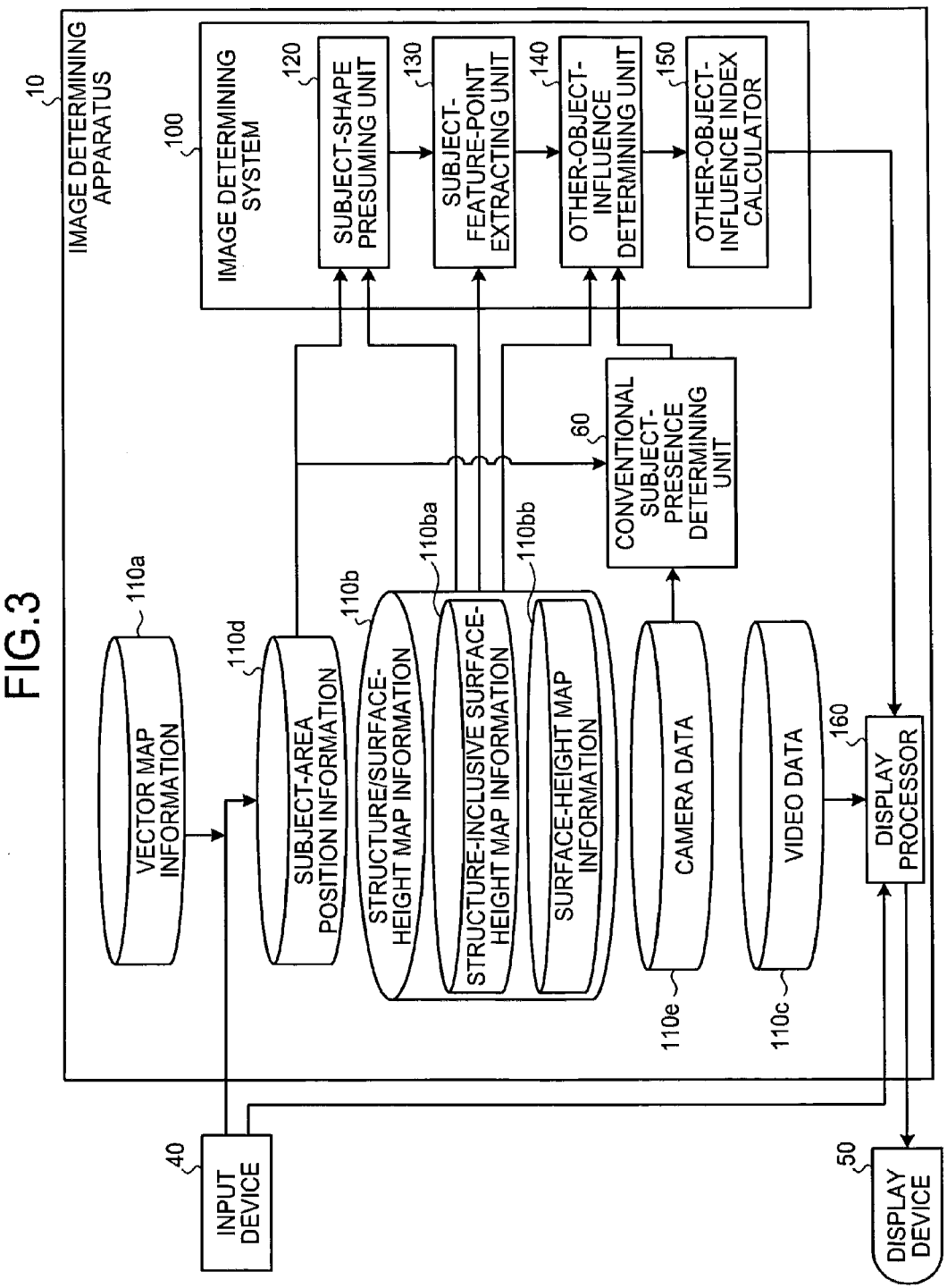
FIG. 3 is a functional block diagram of the configuration of an image determining apparatus according to a first embodiment of the present invention.

Next, the first embodiment is explained in detail with reference to the accompanying drawings as a specific example embodying the principle of the image determining method of the present invention. The first embodiment is an exemplary configuration of an apparatus which incorporates the image determining system (hereinafter, "image determining apparatus"). FIG. 3 is a functional block diagram of the configuration of the image determining apparatus according to the first embodiment. As shown in FIG. 3, an image determining apparatus 10 includes an input device 40, a display device 50, vector map information 110a, a conventional subject-presence determining unit 60, video data 110c, and a display processor 160 in addition to those shown in the drawing of the principle of the present invention of FIG. 1. The image determining apparatus 10 includes, as examples of the structure/surface height map information 110b, structure-inclusive surface-height map information 110ba and surface-height map information 110bb.

The input device 40 includes a keyboard or a mouse, and the display device 50 is an output device such as a display.

Figure 4:
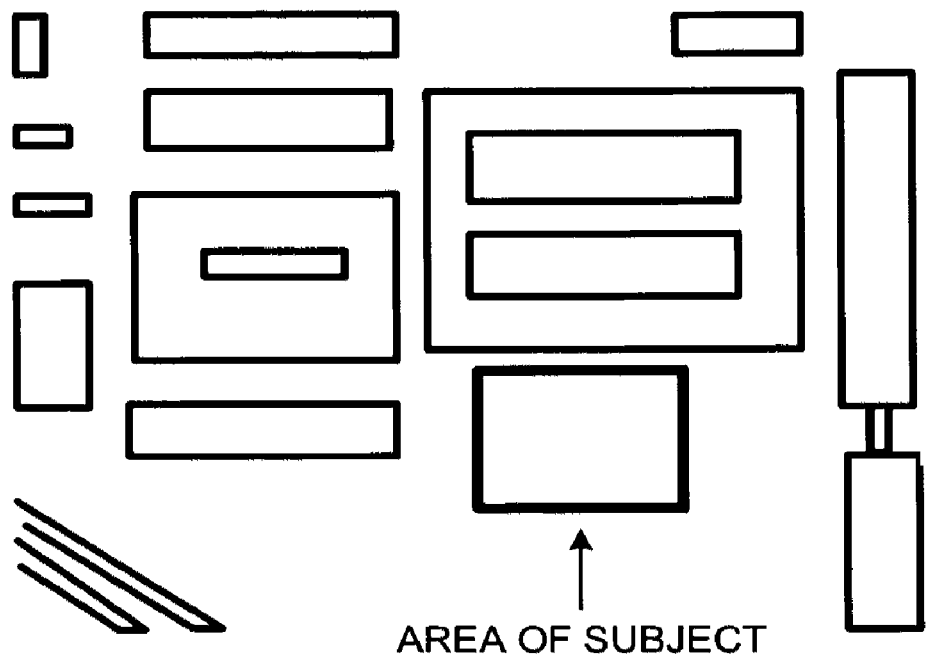
FIG. 4 is an example of a vector map, which is vector map information.

The vector map information 110a is a general vector map as shown in FIG. 4, and indicates an area where the subject such as a structure is present on a map. In an example of the first embodiment, the user specifies the position of the area of the subject to be determined by using the vector map, and uses a vector figure agreeing with the specified position as the subject-area position information 110d.

Figure 5:
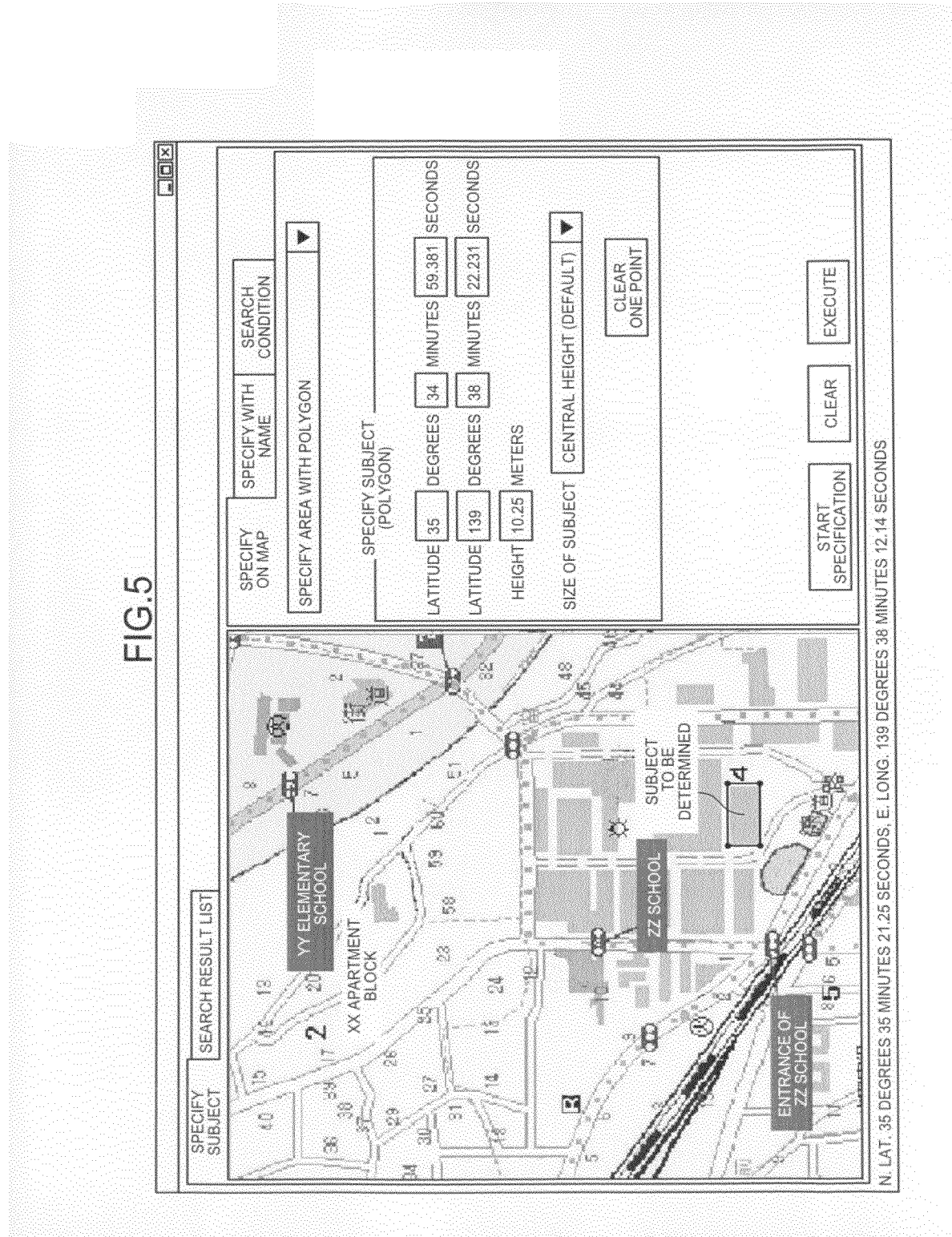
FIG. 5 is an example of a screen on a display device that prompts a user to input, using the vector map to obtain subject-area position information.

FIG. 5 is an example in which the apparatus incorporating the image determining method of the first embodiment uses the vector map displayed on the display device 50 on starting up the image determining system. The user specifies the subject to be determined based on the vector map displayed on the display device 50 to select a vector shape on the vector map, and treats the position information such as the latitude and the longitude of each point on the vector shape, that is, a contour point of the area of the subject to be determined as the subject-area position information 110d. At this time, the user uses the input device 40 to trace to specify the subject to be determined present on the vector map displayed on the display device 50, and thereby selects the vector shape on the specified position.

Figure 6:
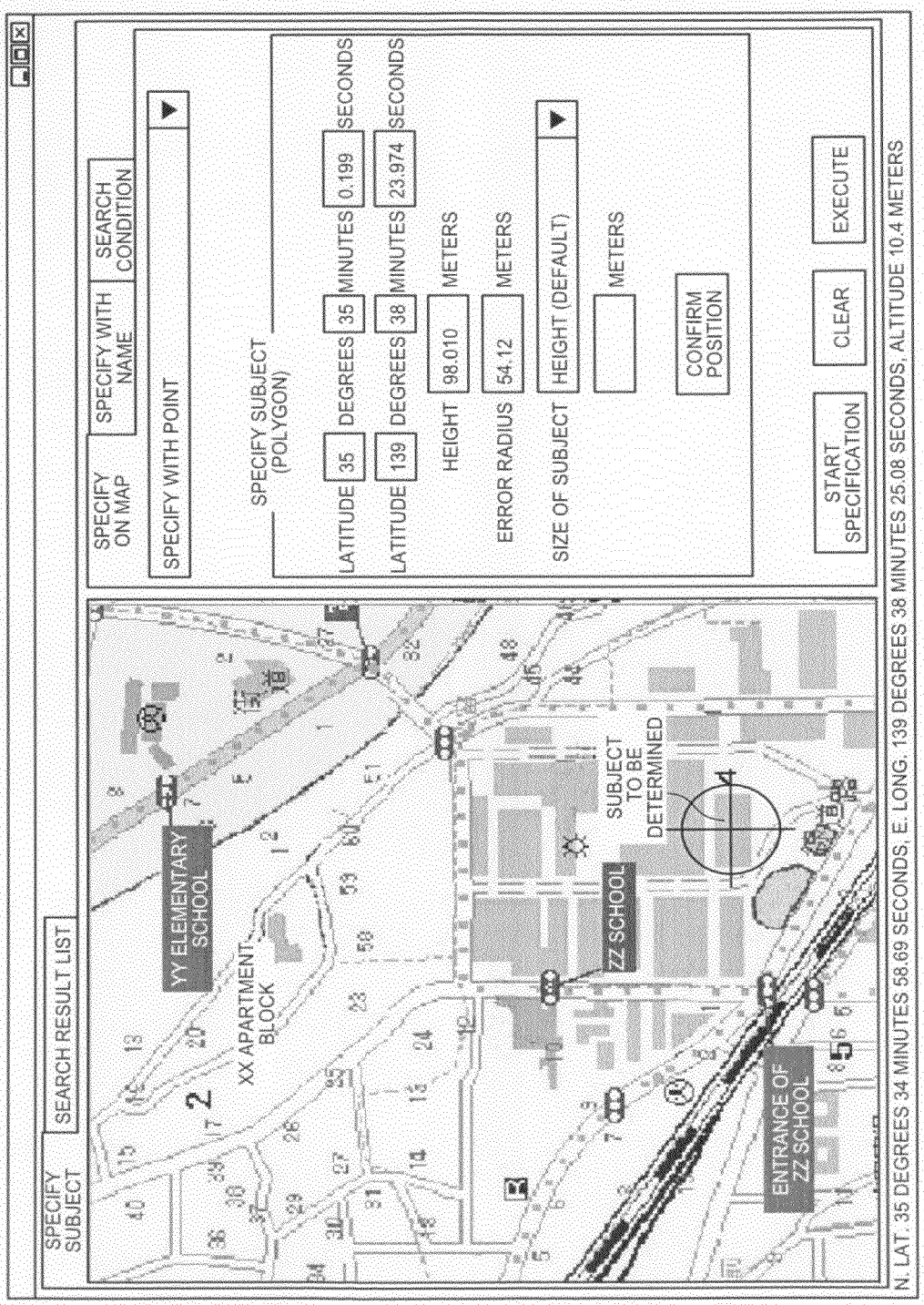
FIG. 6 is another example of a screen on the display device that prompts a user an input using the vector map to obtain the subject-area position information.
Figure 7:
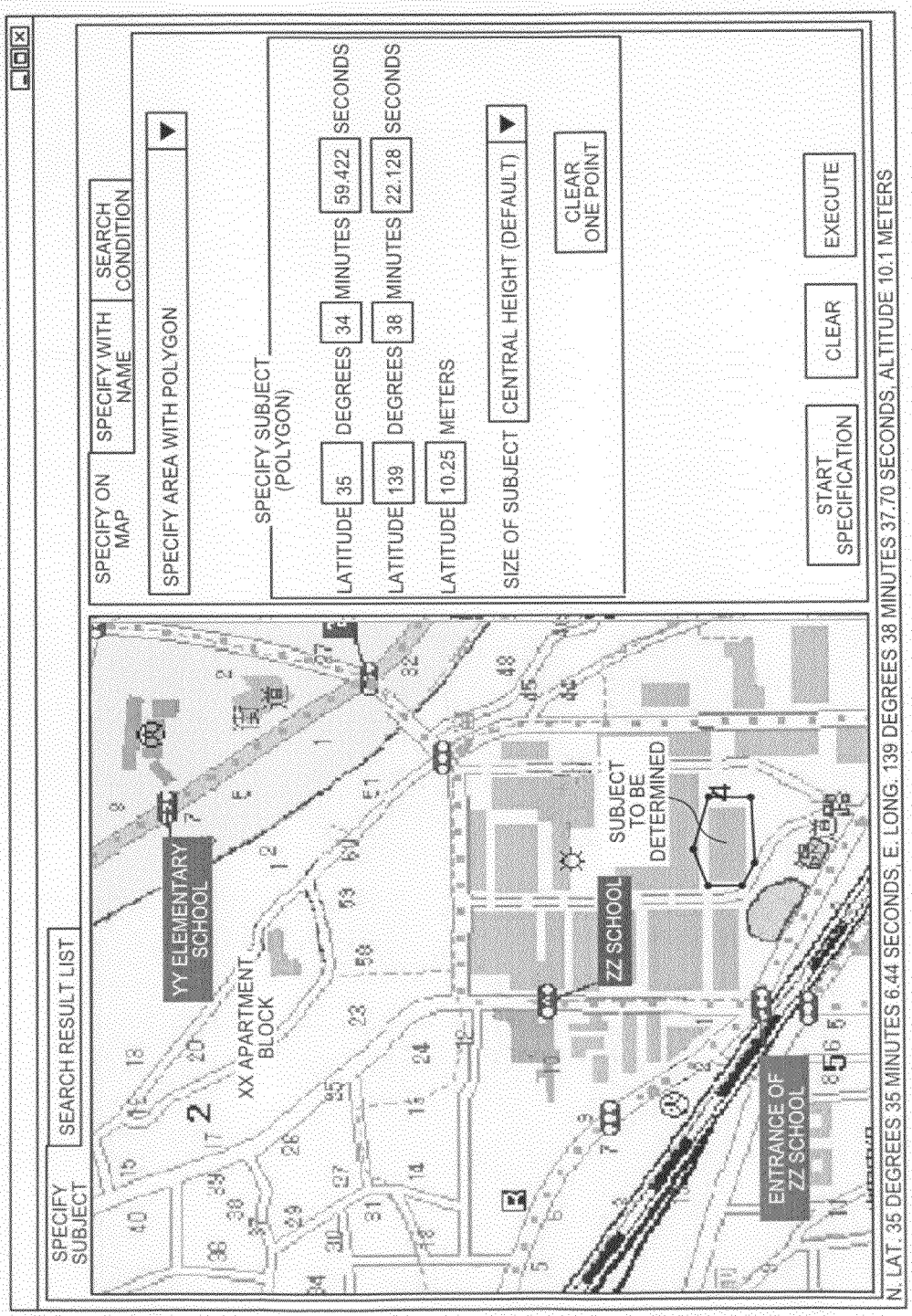
FIG. 7 is still another example of a screen on the display device that prompts a user an input using the vector map to obtain the subject-area position information.

The method of obtaining the subject-area position information 110d by using the vector map information 110a is not limited to the method shown in FIG. 5, and for example, as shown in FIG. 6, the user can circle the subject to be determined to specify a surrounding vector shape, or as shown in FIG. 7, the user can enclose the subject to be determined with a polygon to specify a surrounding vector shape. Alternatively, it is possible to prepare data associating the vector diagram on the vector map with a name, address, telephone number, or the like so that the vector diagram can be specified by the name, address, telephone number, or the like.

The subject-area position information 110d can be obtained without the use of the vector map information 110a unlike the first embodiment. In this case, the contour of the subject area to be determined can be directly specified by a numerical value such as the latitude and the longitude. Alternatively, a photograph of a surrounding area of the subject shot from the sky or a drawing of the surrounding area may be displayed instead of the vector map of FIG. 4, and the user may draw a contour of the area of the subject to be determined using an input device similar to the one shown in FIG. 4, so that the position of the drawing is directly converted into the latitude and the longitude as the specified position.

In the first embodiment, by way of example, the structure/surface-height map information 110b includes the structure-inclusive surface-height map information 110ba, which is a digital map of the height of the surface including the structure, and the surface-height map information 110bb, which is a digital map of the height of the pure surface. The structure-inclusive surface-height map information 110ba holds the height of a structure for a position where there is a structure, and the height of a pure surface for a position where there is no structure in association with respective positions. The configuration and the content are only exemplary, and the structure-inclusive surface-height map information 110ba can divide the data and hold each piece of the data, such as the height map of only man-made constructions among the structures, the height map of only trees among the structures, and the height map of only the ground surface, separately, or can divide the data in a unit of municipal province or the like and hold each piece of the data separately.

The camera data 110e is a data group including the camera data such as the position, the direction, and the angle of view of the camera at the time of shooting of the video and the image by the camera (not shown).

The video data 110c is the video and the image themselves shot by the cameras (not shown). The video data 110c and the camera data 110e are held in association with each other. The image determining apparatus 10 according to the first embodiment does not directly determine the video data 110c, but incorporates the image determining system 100 which utilizes the associated camera data 110e, and selects the optimum video data of the subject to be determined as specified by the user via the input device 40.

The conventional subject-presence determining unit 60 indirectly examines whether the subject to be determined appears in the corresponding video data 110c by using the camera data 110e in such a manner as described earlier in relation with the conventional technique. The conventional subject-presence determining unit 60 uses the camera position, the direction of shooting, and the angle of view in the camera data 110e to define the shooting space of the camera as an elliptic cone or a quadrangular pyramid. The conventional subject-presence determining unit 60 uses the position information of the area of presence of the subject to be determined in the subject-area position information 110d to determine whether there is the subject to be determined in the shooting space. Specifically, the conventional subject-presence determining unit 60 compares the positions of the respective points of the vector shape of the subject to be determined with the position of the shooting space to determine whether a part or all of the vector shape is included in the shooting space. When the vector shape is included in the shooting space, the conventional subject-presence determining unit 60 regards that the subject to be determined is in the shooting space and determines that the corresponding camera data 110e and the corresponding video data 110c are the data in which the subject to be determined appears.

Actually, in the conventional technique, it is often determined whether the subject to be determined is in the shooting space, not by using the shape (points of the contour) of the area of the subject to be determined but by using the position (one point) of the subject to be determined. In the first embodiment, because the subject-area position information 110d in the system is obtained from the vector map information 110a, the shape (points) of the area of the subject to be determined is used. However, as shown in the principle of the present invention in FIG. 1, the subject-area position information 110d can hold one point or a plurality of points. Therefore, determination can be performed on whether the subject to be determined is in the shooting space, using one point as in the conventional technique.

In the first embodiment, the camera data 110e is not directly delivered to the image determining system 110. Instead, the camera data 110e is first delivered to the conventional subject-presence determining unit 60 which does not pass through the camera data corresponding to the video data in which the subject to be determined is not within the shooting area of each camera. Accordingly, the camera data corresponding to the video data in which the subject to be determined does not appear is not input to the image determining system 110 in the first place, and the pictured status which is affected by the presence of other object is not determined for such data.

The subject-shape presuming unit 120 compares the position information of the contour of the area of the subject to be determined in the subject-area position information 110d obtained from the vector map information 110a with the structure-inclusive surface-height map information 110ba in the structure/surface-height map information 110b and examines the height of the structure-inclusive surface associated with the positions of the respective points of the contour, thereby extracting an upper face of the rough shape of the subject to be determined. Likewise, the subject-shape presuming unit 120 compares the position information of the contour with the surface-height map information 110bb in the structure/surface-height map information 110b and examines the height of the surface associated with the positions of the respective points of the contour, thereby extracting a lower face of the rough shape of the subject to be determined. Heightwise, the rough shape is between the upper face and the lower face.

Figure 8:
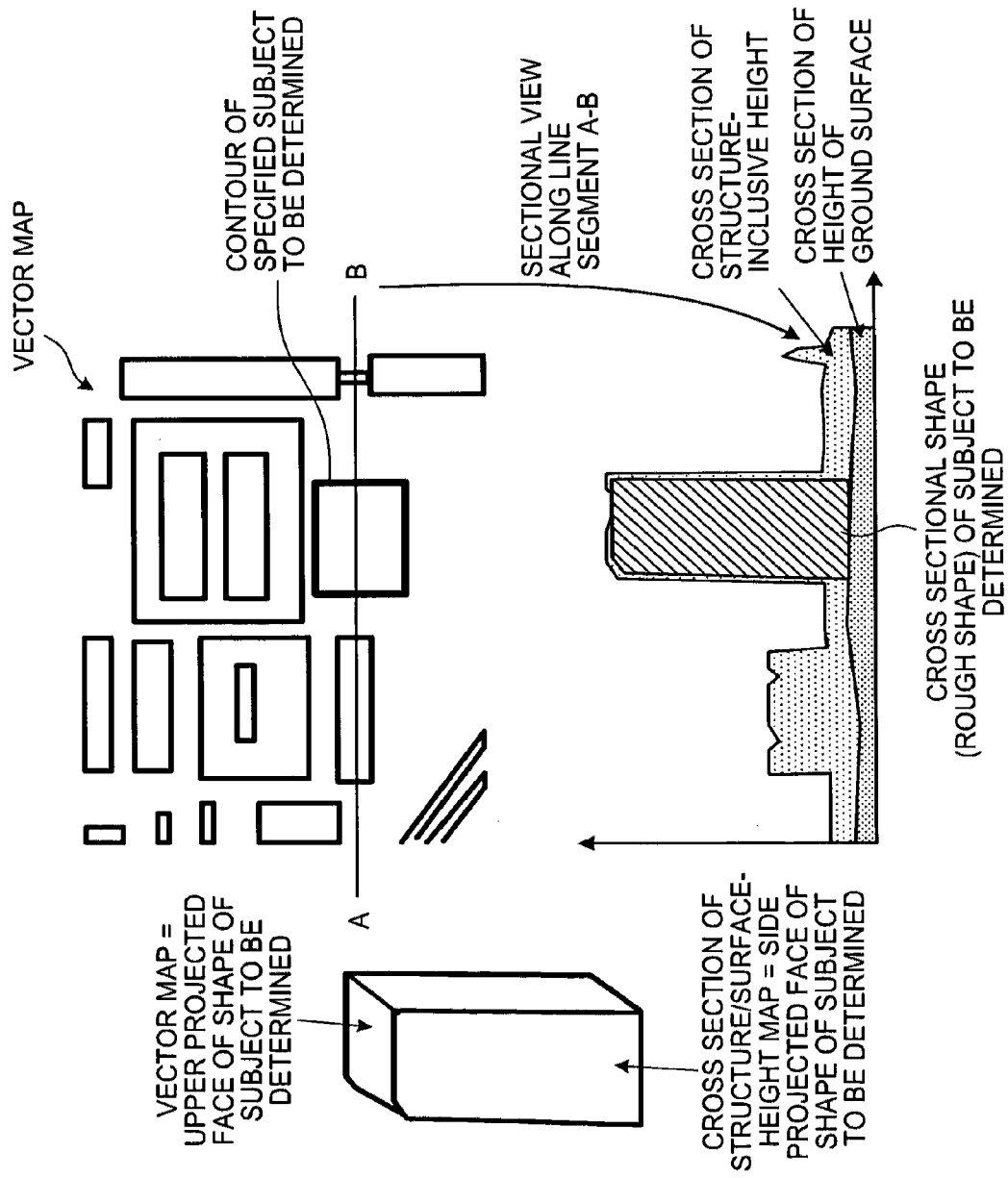
FIG. 8 is a schematic diagram for explaining a process in which a subject-shape presuming unit obtains a rough shape of a subject to be determined.

FIG. 8 is a schematic diagram for explaining a process performed by the subject-shape presuming unit 120 to obtain the rough shape of the subject to be determined. As shown in FIG. 8, the rough shape of the subject to be determined is obtained by adding the latitude value and the longitude value of an optional point on the contour of the corresponding vector diagram (the diagram shown by a heavy line. In FIG. 8, vector diagrams other than the subject to be determined are shown by a thin line for easy understanding), the height of the structure-inclusive surface-height map information 110ba, and the height of the surface-height map information 110bb corresponding to the latitude and the longitude value. The subject-shape presuming unit 120 passes the extracted shape information of the subject to be determined to the subject-feature-point extracting unit 130.

The method of extracting the rough shape of the subject to be determined is not limited to the above described one, and for example, the central position of the contour shape of the subject may be obtained so that the height at the central position can be used as the height of the subject, and the precise heights of respective points on the contour of the subject may not be obtained.

Figure 9:
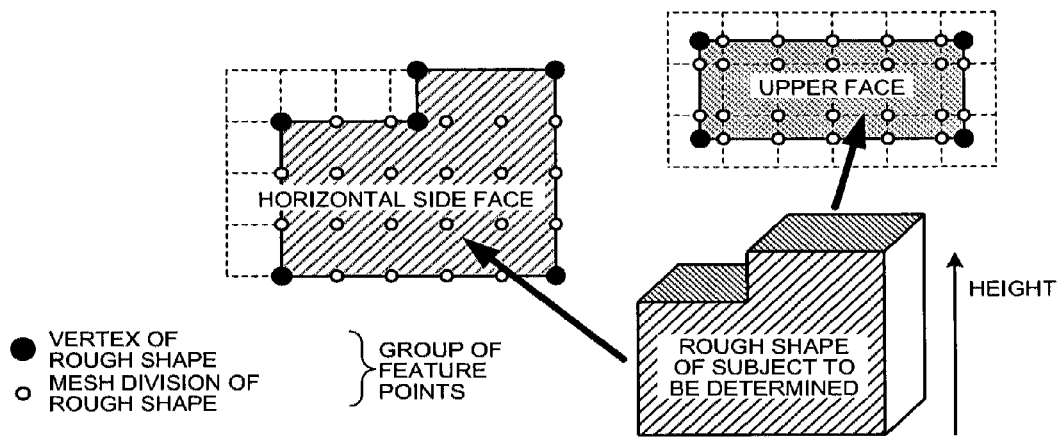
FIG. 9 is a schematic diagram for explaining a process performed by a subject-feature-point extracting unit.

The subject-feature-point extracting unit 130 obtains the rough shape information of the subject to be determined from the subject-shape presuming unit 120, and appropriately examines the height of the structure and the height of the surface in the structure/surface-height map information 110b to extract the feature point of the subject to be determined. A process performed by the subject-feature-point extracting unit 130 is specifically explained below. FIG. 9 is a schematic diagram for explaining the process performed by the subject-feature-point extracting unit 130.

As shown in FIG. 9, the subject-feature-point extracting unit 130 divides the side face and the upper face of the rough shape of the subject to be determined by a mesh of an arbitrary interval. The dividing interval can be determined by one specific value (for example, 5 meters) or by a plurality of prepared numerical values (for example, 1 meter, 5 meters, and 10 meters).

The subject-feature-point extracting unit 130 appropriately examines the height of the structure in the structure/surface-height map information 110b, that is, the height of the structure-inclusive surface-height map information 110ba to calculate the height of the respective lattice points, specifically, of the mesh dividing the upper face. The height of each lattice point may not be precisely obtained, similarly to the height of respective points on the contour of the subject to be determined obtained by the subject-shape presuming unit 120, but the height of a representative position such as a central position of the contour shape can be used as a common height of the respective lattice points of the mesh.

The subject-feature-point extracting unit 130 assumes that the height of the respective lattice points of the mesh dividing the side face takes a value obtained by interpolating the height of the upper face of the structure (the height of the structure-inclusive surface-height map information 110ba) and the height of the lower ground plane (the height of the surface-height map information 110bb) at the specified mesh intervals.

The subject-feature-point extracting unit 130 in the first embodiment extracts the respective lattice points of the mesh dividing the side face and the upper face of the rough shape of the subject to be determined at the arbitrary intervals and a group of vertexes of the rough shape as a group of feature points for this particular division interval. The subject-feature-point extracting unit 130 passes the information of the extracted group of feature points and the shape information of the subject to the other-object-influence determining unit 140.

The method of extracting the feature points performed by the subject-feature-point extracting unit 130 is not limited to the above described one, and random values of the height, the latitude, and the longitude can be obtained as points included in the side face or the upper face of the subject to be determined, and the obtained respective random values can be treated as the feature points.

Alternatively, the subject to be determined can be subjected not to mesh division but to strip division, and the respective lattice points of the strip and the group of vertexes of the rough shape can be treated as the group of feature points. Further, the feature point is not limited to points on the side face and the upper face of the rough shape, and a point inside the rough shape can be treated as the feature point. Still alternatively, a single feature point can be extracted so that the calculation amount of the subject-feature-point extracting unit 130 is reduced. In this case, for example, a point at the center of gravity (the averaging position of all vertexes) of the subject to be determined is designated as the feature point. The group of feature points may not be obtained evenly from the rough shape, and the calculation may be performed so that the number of feature points obtained from a specific part, for example, an upper level portion of the structure which is more noticeable, is larger than that in other parts.

The other-object-influence determining unit 140 checks if there is an object between the camera and the respective feature points of the subject to be determined based on three pieces of information, that is, the shape information of the subject to be determined and the information of the group of feature points obtained by the subject-feature-point extracting unit 130, the structure/surface-height map information 110b, and the camera data 110e which is determined to correspond to video data in which the subject to be determined appears by the conventional subject-presence determining unit 60, and further determines whether the found object is the subject to be determined itself, thereby presuming other-object influence, i.e., how much the subject to be determined is hidden by other objects.

Figure 10A:
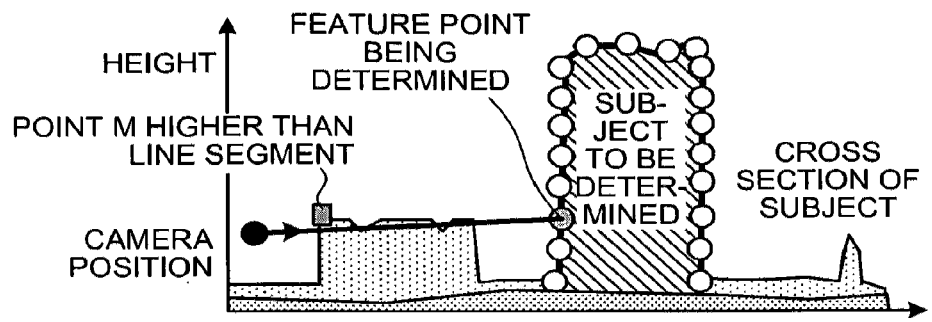
FIGS. 10A to 10C are schematic diagrams for explaining a process performed by an other-object-influence determining unit.
Figure 10B:
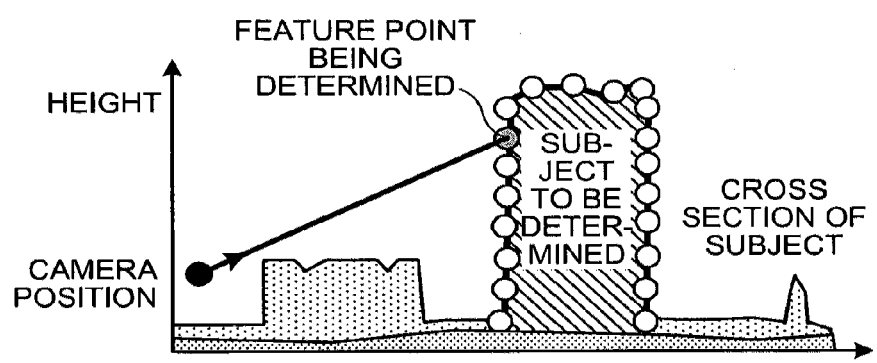
Figure 10C:
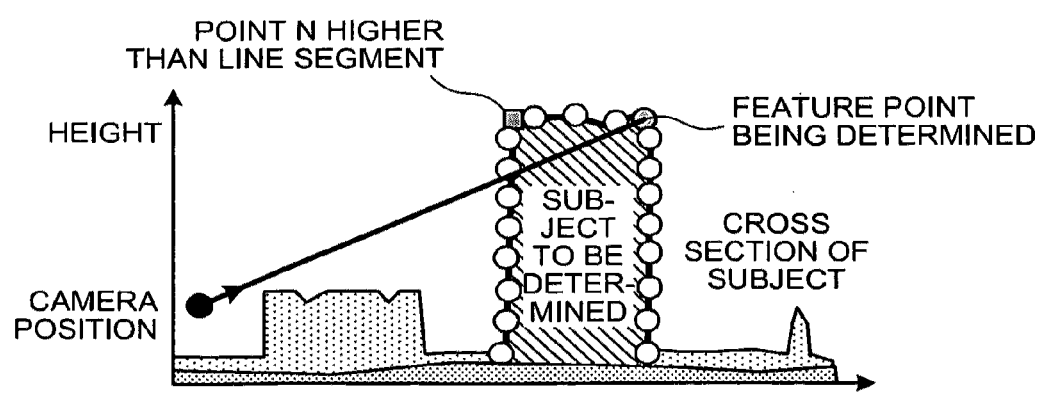

FIGS. 10A to 10C are schematic diagrams for explaining the process performed by the other-object-influence determining unit 140. As shown in FIGS. 10A to 10C, the other-object-influence determining unit 140 draws a line segment connecting the camera position and the feature point to determine whether there is any object beyond the line segment. Specifically, the other-object-influence determining unit 140 checks the heights of the structures along the line segment between the camera position and the feature point using the structure-inclusive surface-height map information 110ba of the structure/surface-height map information 110b, searching for a point at which the height of the structure is higher than the height of the line segment. When the point is found, the other-object-influence determining unit 140 determines whether the point corresponds to the subject to be determined itself or not based on the shape information of the subject to be determined. When the point does not correspond to the subject to be determined itself, the other-object-influence determining unit 140 determines that the point corresponds to other object.

For example, as shown in FIG. 10A, when a point M higher than the line segment between the feature point and the camera position is found in the structure-inclusive surface-height map information 110ba and the point M is not the point of the subject to be determined, the other-object-influence determining unit 140 determines that "there is another object between the camera and the feature point of the subject to be determined". In this case, the feature point connected to the camera position by the line segment is determined to be a feature point hidden by other object (hereinafter, "feature point B").

As shown in FIG. 10B, when there is no point higher than the line segment between the feature point and the camera position in the structure-inclusive surface-height map information 110ba, the other-object-influence determining unit 140 determines that "there is no other object between the camera and the feature point of the subject to be determined". In this case, the feature point on the line segment to the camera position is determined to be a feature point not hidden by other object (hereinafter, "feature point A").

As shown in FIG. 10C, when a point N higher than the line segment between the feature point and the camera position is found in the structure-inclusive surface-height map information 110ba, and the point N is the point in the subject, the other-object-influence determining unit 140 determines that "there is no other object between the camera and the feature point of the subject to be determined". In this case, the feature point on the line segment to the camera position is determined to be a feature point hidden by the subject itself (hereinafter, "feature point C").

The other-object-influence determining unit 140 performs the determination with respect to the respective groups of feature points and counts the number of feature points A, feature points B, and feature points C, and passes the information of the number of respective feature points A to C to the other-object-influence index calculator 150 as number information.

The other-object-influence index calculator 150 obtains the number information from the other-object-influence determining unit 140 and calculates a rate by which the subject to be determined is hidden by other object based on the obtained number information as an other-object-influence index. An example of a specific equation for calculating the rate by which the subject is hidden by other object is expressed as [rate by which subject is blocked by other object]=[number of feature points B]÷[(number of all feature points (A+B+C)]−[number of feature points C)]. The other-object-influence index calculator 150 of the first embodiment directly uses the calculated rate by which subject is hidden by other object as the other-object-influence index of the subject to be determined, and passes the rate to the display processor 160.

The method of calculating the rate by which the subject is hidden by other object and the final other-object-influence index is not limited to the above described one, and for example, a difference in importance of the feature points may be taken into consideration and weighted calculation may be performed. Specifically, the position information and the like of the respective feature points may be obtained in addition to the number information from the other-object-influence determining unit 140. When a structure is a landmark, the feature points corresponding to a part of the structure which has a characteristic shape may be weighted more than other points, or when the area is heavily built-up, the influence of lower levels of the structure is regarded as not important, and weighting is performed such that the feature points corresponding to upper levels are more heavily weighted. Then, the final other-object-influence index may be calculated.

The display processor 160 obtains the other-object-influence index of the subject to be determined from the other-object-influence index calculator 150, and searches the video data 110c corresponding to the camera data 110e of a target of determination based on the obtained index value to reproduce and display the data on the display device 50. FIG. 11 is an example of an interface on which the display processor 160 displays video and image data using the other-object-influence index.

As shown in FIG. 11, the display processor 160 according to the first embodiment of the present invention arranges video data ((a), (b), and (e)) and image data ((c), (d), and (f) to (k)) in an ascending order of the value of the other-object-influence index (in other words, from data with a smaller value to data with a larger value. In this example, it is assumed that the one with a smaller value is hidden by other object by a smaller amount). To recommend an image in which the subject to be determined appears better, video and image data having a smaller other-object-influence index value than a predetermined value is regarded as an optimum video and image data of the subject to be determined, and, corresponding video and image data such as (a) to (e) in FIG. 11 are displayed as thumbnails in colors. On the other hand, the video and image data having an other-object-influence index value equal to or larger than the predetermined value is regarded as inappropriate video and image data of the subject to be determined, and thumbnail images of corresponding video and image such as (f) to (k) in FIG. 11 are displayed in black and white.

In FIG. 11, in the first embodiment, the result is displayed with the video and image data in an original form. However, a portion where the other-object-influence index value is small, in other words, a portion where the subject to be determined appears better and is not significantly covered by other object may be extracted from the video data. Thus, the video data may be divided into plural shots and only those portions with small other-object-influence index values may be displayed. Data can be displayed in any manner, for example, file names of recommended video pictures and images may be listed, or video pictures and images are displayed in three dimensional computer graphics (CG) so that highly recommended video pictures and images are displayed larger and closer to the screen.

Figure 12:
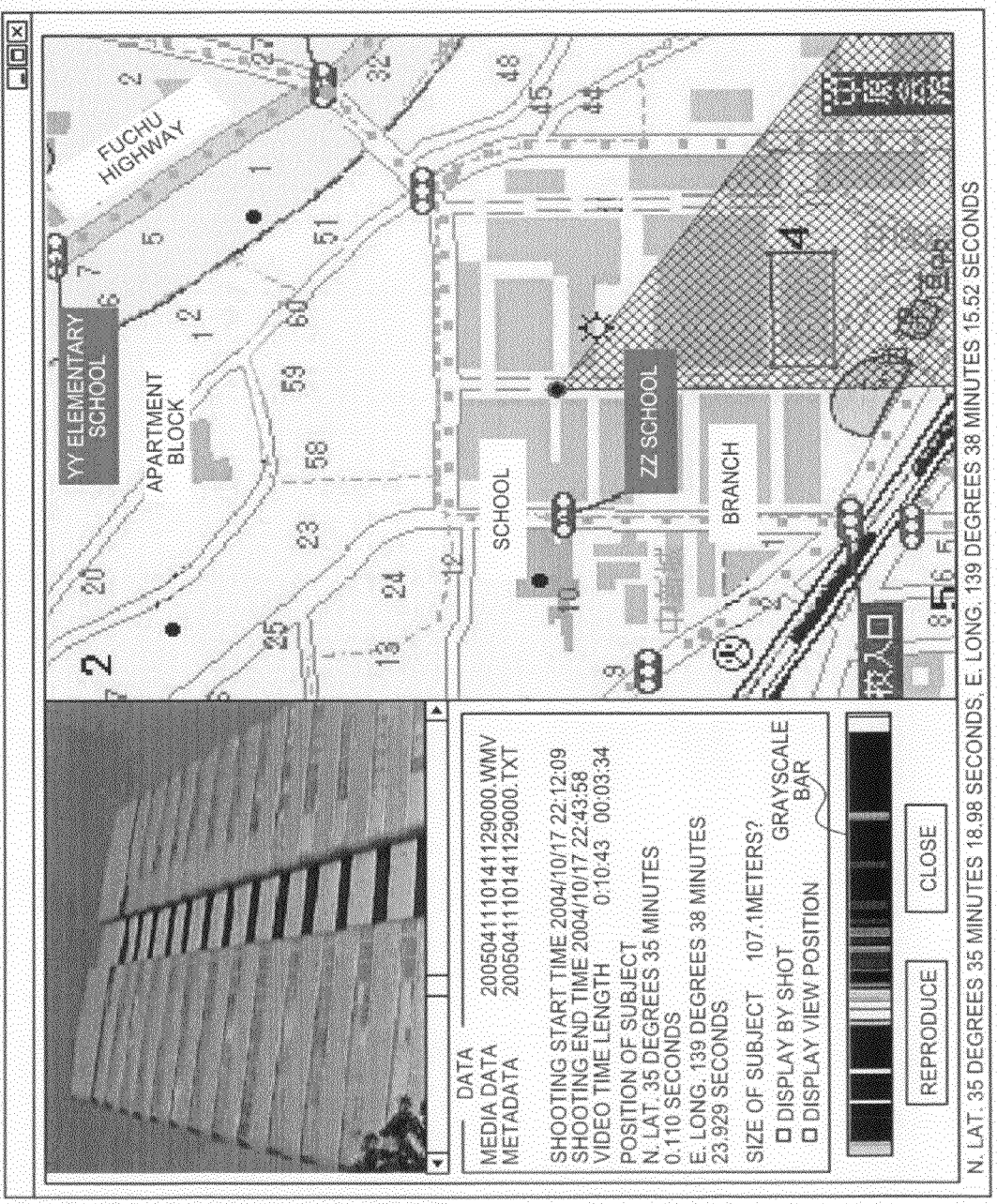
FIG. 12 is an example of a display screen when video data A is selected in FIG. 11.

When the user selects video data via the input device 40 from the screen shown in FIG. 11 displayed by the display device 50, the display processor 160 according to the first embodiment of the present invention starts reproduction of the selected video and image data for viewing. FIG. 12 is an example of a screen displayed when video data (a) is selected in FIG. 11. In FIG. 12, of the image frame group of the video picture, an image frame, for which it is determined that there is the subject to be determined in the shooting area of the camera by the conventional subject-presence determining unit 60, and also determined that the other-object-influence index is low (in other words, an influence by other object is small) by the image determining system 100 in the present method, is displayed in white on a black and white grayscale bar. By selecting only those white parts of the grayscale bar, the user can reproduce and view only those video frames which are recommended by the present system and in which the subject to be determined appears without being hidden by other object. As shown in FIG. 12, the pictured status of the subject to be determined obtained based on the other-object-influence index can be displayed by the grayscale bar, or the value of the other-object-influence index can be displayed in a specific numerical value. When the video data is divided into video shots and only the image frames having a small value of the other-object-influence index in FIG. 11 are collected, because all the video shots reproduced in FIG. 12 are expected to be well-pictured, it is not necessary to specifically display the other-object-influence index or the pictured status.

Figure 13:
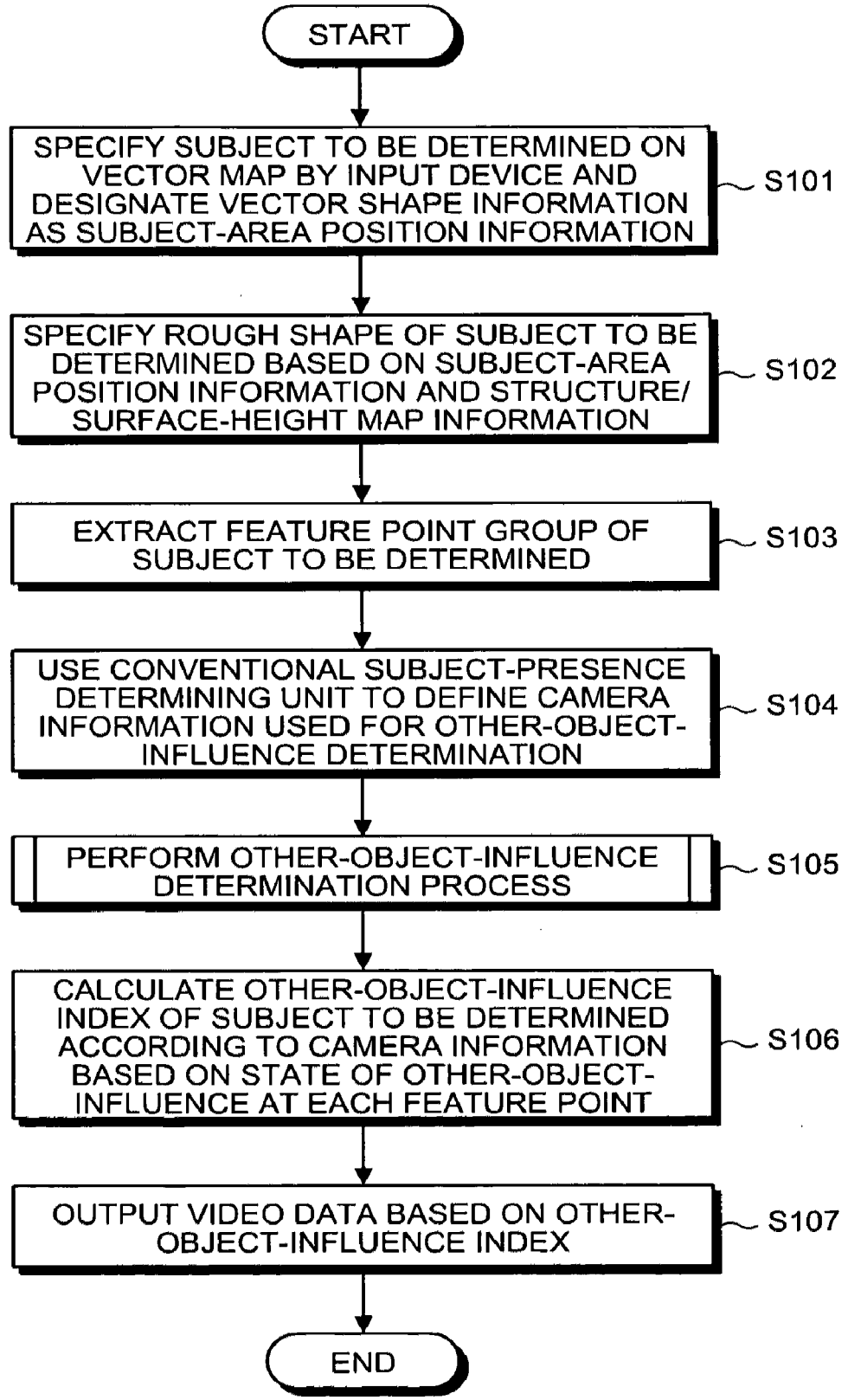
FIG. 13 is a flowchart of a process procedure performed by the image determining apparatus of the first embodiment.

A process procedure performed by the image determining apparatus 10 according to the first embodiment is explained next. FIG. 13 is a flowchart of the process procedure performed by the image determining apparatus 10 shown in the first embodiment. As shown in FIG. 13, the image determining apparatus 10 is separated to a part which performs a process of the image determining system 100 (S102 to S106) and a part which prepares the data used before and after the process of the image determining system 100 and controls input and output (S101, S104, and S107).

Firstly, the image determining apparatus 10 specifies, via the input device 40, an area relating to the subject to be determined on the vector map information 110a displayed on the display device 50 to obtain the subject-area position information 110d from the specified vector shape information (step S101).

The subject-shape presuming unit 120 specifies the rough shape of the subject based on the subject-area position information 110d and the structure/surface-height map information 110b (step S102), and the subject-feature-point extracting unit 130 extracts a group of feature points (step S103).

The conventional subject-presence determining unit 60 uses the camera data 110e and the subject-area position information 110d to sort out the camera data in which the subject to be determined appears (step S104).

The other-object-influence determining unit 140 uses the determined camera data, the group of feature points of the subject to be determined, and the structure/surface-height map information 110b to execute an other-object-influence determination process for each feature point (step S105).

The other-object-influence index calculator 150 calculates the other-object-influence index value (step S106), and the display processor 160 outputs the video data 110c based on the other-object-influence index (step S107).

Figure 14:
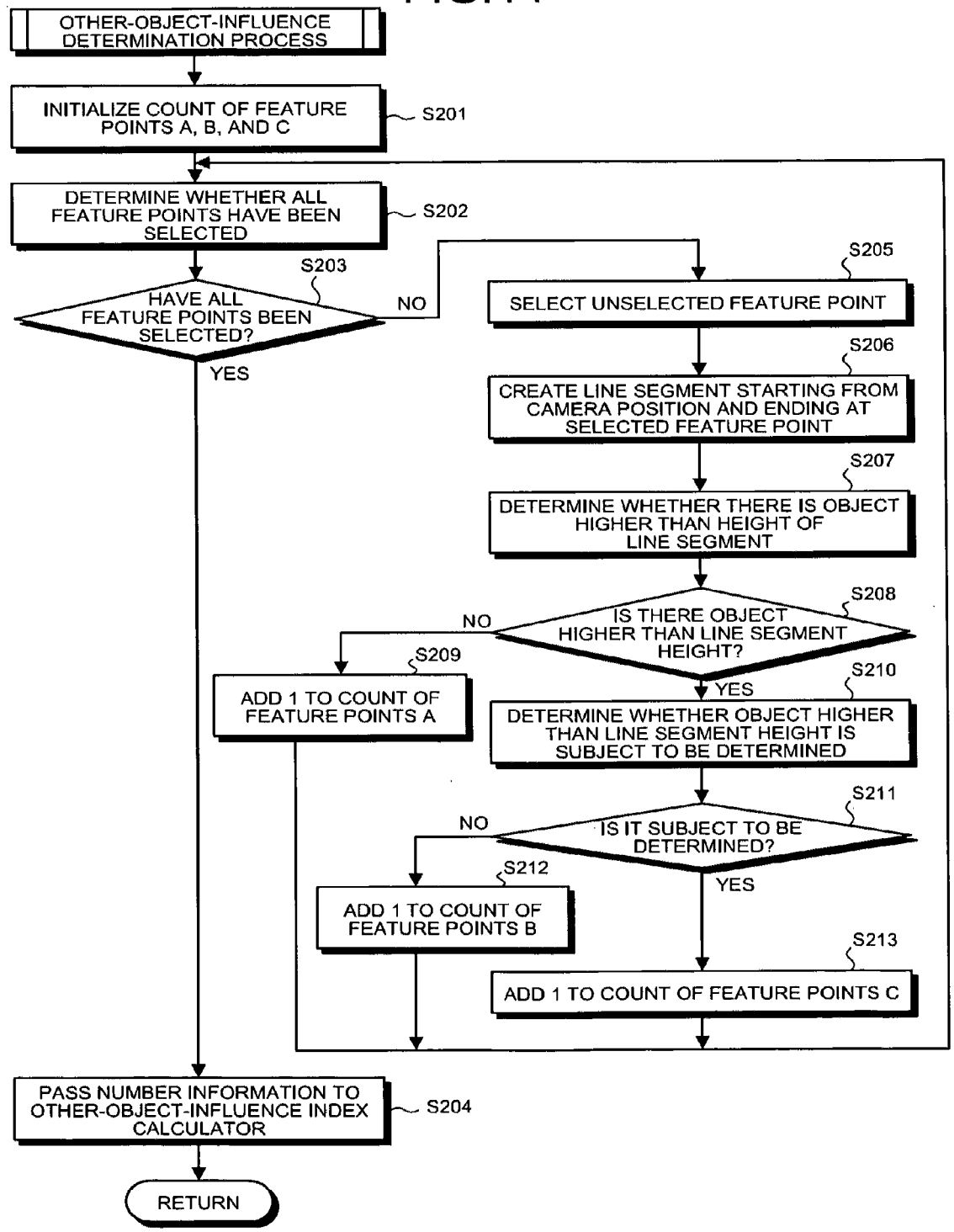
FIG. 14 is a flowchart of an other-object-influence determining process shown at step S105 in FIG. 13.

The other-object-influence determination process shown at step S105 in FIG. 13 is explained next. FIG. 14 is a flowchart of the other-object-influence determination process shown at step S105 in FIG. 13. As shown in FIG. 13, the other-object-influence determining unit 140 initializes the count of the feature points A, B, and C (sets the number of feature points A, B, and C to 0) (step S201), and determines whether all the feature points have been selected (step S202).

When all the feature points have been selected (YES at step S203), the other-object-influence determining unit 140 transmits the number information to the other-object-influence index calculator 150 (step S204). On the other hand, when all the feature points have not been selected (NO at step S203), the other-object-influence determining unit 140 selects an unselected feature point (step S205) to create a line segment starting from the camera position and ending at the selected feature point (step S206).

The other-object-influence determining unit 140 determines whether there is an object higher than the height of the created line segment (step S207). When there is no object higher than the line segment (NO at step S208), the other-object-influence determining unit 140 adds one to the count of the feature points A (step S209) and proceeds to step S202.

On the other hand, when there is an object higher than the line segment (YES at step S208), the other-object-influence determining unit 140 determines whether the object higher than the line segment is the subject to be determined (step S210). When the object higher than the line segment is not the subject to be determined (NO at step S211), the other-object-influence determining unit 140 adds one to the count of the feature points B (step S212) and proceeds to step S202.

On the other hand, when the object higher than the line segment is the subject to be determined (YES at step S211), the other-object-influence determining unit 140 adds one to the count of the feature points C (step S213) and proceeds to step S202.

In this manner, because the other-object-influence determining unit 140 generates the number information, the other-object-influence index calculator 150 calculates the other-object-influence index by using the number information, and the display processor 160 displays the video data 110c on the display device 50 based on the other-object-influence index, the user can efficiently select the optimum video data.

In the image determining apparatus 10 according to the first embodiment, the subject-shape presuming unit 120 extracts the shape of the specified subject to be determined based on the subject-area position information 110d and the structure/surface-height map information 110b, and the subject-feature-point extracting unit 130 extracts the feature points based on the shape of the subject to be determined. Further, the other-object-influence determining unit 140 generates classified number information of the feature points relating to the other-object-influence by other object based on the camera data 110e, the shape of the subject to be determined, the feature points, and the structure/surface-height map information 110b, and the other-object-influence index calculator 150 calculates the other-object-influence index for each camera data based on the number information. As shown in the first embodiment, because the calculated other-object-influence index for each camera data can be used as a recommendation degree with respect to the pictured status relating to the other-object-influence by other object of the subject to be determined when the display processor 160 displays the associated video data 110c on the display device 50, the optimum video picture data can be selected even when there is other object between the camera and the subject to be determined.

The structure/surface-height map information 110b according to the first embodiment includes the surface-height map information 110bb, which is the pure height of the surface, in addition to the structure-inclusive surface-height map information 110ba, however, only the structure-inclusive surface-height map information 110ba can replace the surface-height map information 110bb. In the first embodiment, the subject-shape presuming unit 120 uses the surface-height map information 110bb to obtain the lower face of the subject shape, that is, the height of the contact surface with the ground surface. In the following, an example is explained where the subject-shape presuming unit 120 obtains the information of the lower contact surface of the subject with the ground, that is, the height information of the ground surface at the subject position based on the subject-area position information 110d and the structure-inclusive surface-height map information 110ba.

The subject-shape presuming unit 120 compares the structure-inclusive surface-height map information 110ba with the subject-area position information 110d, to obtain the height of the structure-inclusive ground surface corresponding to the area not included in the subject area in the structure-inclusive surface-height map information and sufficiently larger than the subject area (because structures rarely stand next to each other without leaving any space to expose the ground surface therebetween, there is a high possibility that there is a point where there is no structure and the ground surface appears in this large area). The subject-shape presuming unit 120 presumes the lowest height of the obtained heights as a pseudo height of the ground surface of the whole area. If the area set for obtaining the height is too wide and the point of the pseudo height of the ground surface is far from the area where the subject is present, a discrepancy between the pseudo height and the actual height of the ground surface of the area where the subject is present increases. Therefore, the lowest height is not simply adopted, but weighting can be performed using the distance from the subject.

Because the subject-shape presuming unit 120 obtains the height of the ground surface by using the structure-inclusive surface-height map information 110ba and the subject-area position information 110d, the surface-height map information 110bb need not be included in the structure/surface-height map information 110b, whereby information recording capacity, a cost for acquiring the map information, and the time and cost for keeping the map information updated can be reduced.

It is also possible to obtain the subject-area position information 110d using the structure-inclusive surface-height map information 110ba in the structure/surface-height map information 110b instead of the vector map information 110a. An example in which the subject-area position information 110d is obtained by using the structure-inclusive surface-height map information 110ba is explained.

Figure 15:
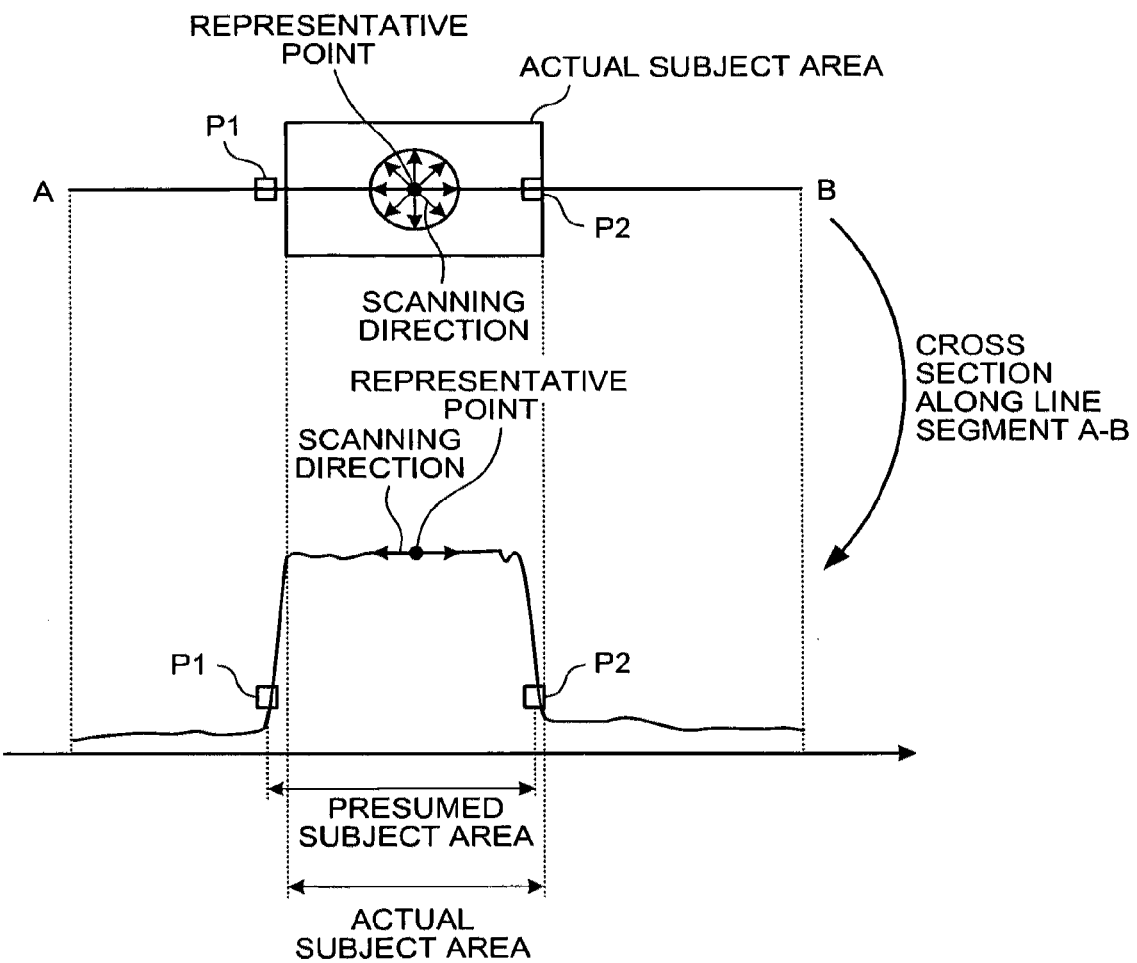
FIG. 15 is a schematic diagram for explaining a method for obtaining the subject-area position information from structure-inclusive surface-height map information.

FIG. 15 is a schematic diagram for explaining a manner of obtaining the subject-area position information 110d based on the structure-inclusive surface-height map information 110ba. As shown in FIG. 15, a point at a representative position is input via the input device 40 or the like to specify the subject to be determined in the same manner as in the conventional subject presence determination. This point at the representative position is set as a representative point on the structure-inclusive surface-height map information 110ba based on values such as latitude and longitude values thereof.

Then, the structure-inclusive ground surface height is obtained at plural points, while the point of height acquisition moves from the representative point to another point equiangularly and outwardly. When the height is obtained at each point, the obtained height is compared with the height obtained at the previous point (or the height of representative point), so that a point where the height changes significantly (for example, a point where the height is equal to or less than one fourth the height of the representative point) is found. The point where the height changes significantly is registered as a peripheral point of the area of the subject to be determined (P1 and P2 are registered as the peripheral points in the example shown in FIG. 15). If the height acquisition is performed equiangularly in a clockwise direction and in an outward direction so that the peripheral points are found and registered, the area of the subject to be determined on the subject-area position information 110d can be obtained as an area surrounded by a line connecting the peripheral points in an order of registration.

In the above, an example in which the subject-area position information 110d is obtained based only on the structure-inclusive surface-height map information 110ba of the structure/surface-height map information 110b has been explained. If the surface-height map information 110bb is additionally employed in finding the difference in height, more precise presumption can be made, for example, on whether a point where the height changes significantly is a point where the structure-inclusive ground surface height changes because of the undulations on the ground surface though the height of the structure is the same (for example, a place where an apartment of a step-like shape is built on an inclined surface), or whether it is a point where the height of the structure itself changes and the ground surface is flat. In the former case, the point is not registered as the peripheral point. In the latter case, the point is registered as the peripheral point. Accordingly, the area of the subject to be determined can be obtained more accurately.

Thus, the subject-area position information 110d can be automatically obtained with the use of the structure/surface-height map information 110b based on one point as the representative position of the subject to be determined, without the need of the vector map information. Accordingly, the vector map information 110a need not to be prepared and recorded in advance, whereby the recording capacity can be reduced, and the subject-area position information 110d can be obtained automatically in a specifying manner as simple as the conventional technique.

Second Embodiment

An apparatus (an image determining apparatus) including an image determining system according to a second embodiment of the present invention is explained next. The image determining apparatus according to the second embodiment divides the height data group in the structure/surface-height map information 110b in the first embodiment into respective map areas in a hierarchical manner and performs clustering, and calculates the maximum height and the minimum height in the area obtained as a result of the clustering. The image determining apparatus efficiently performs the other-object-influence determination and calculates the other-object-influence index using the maximum height of each area.

Figure 16:
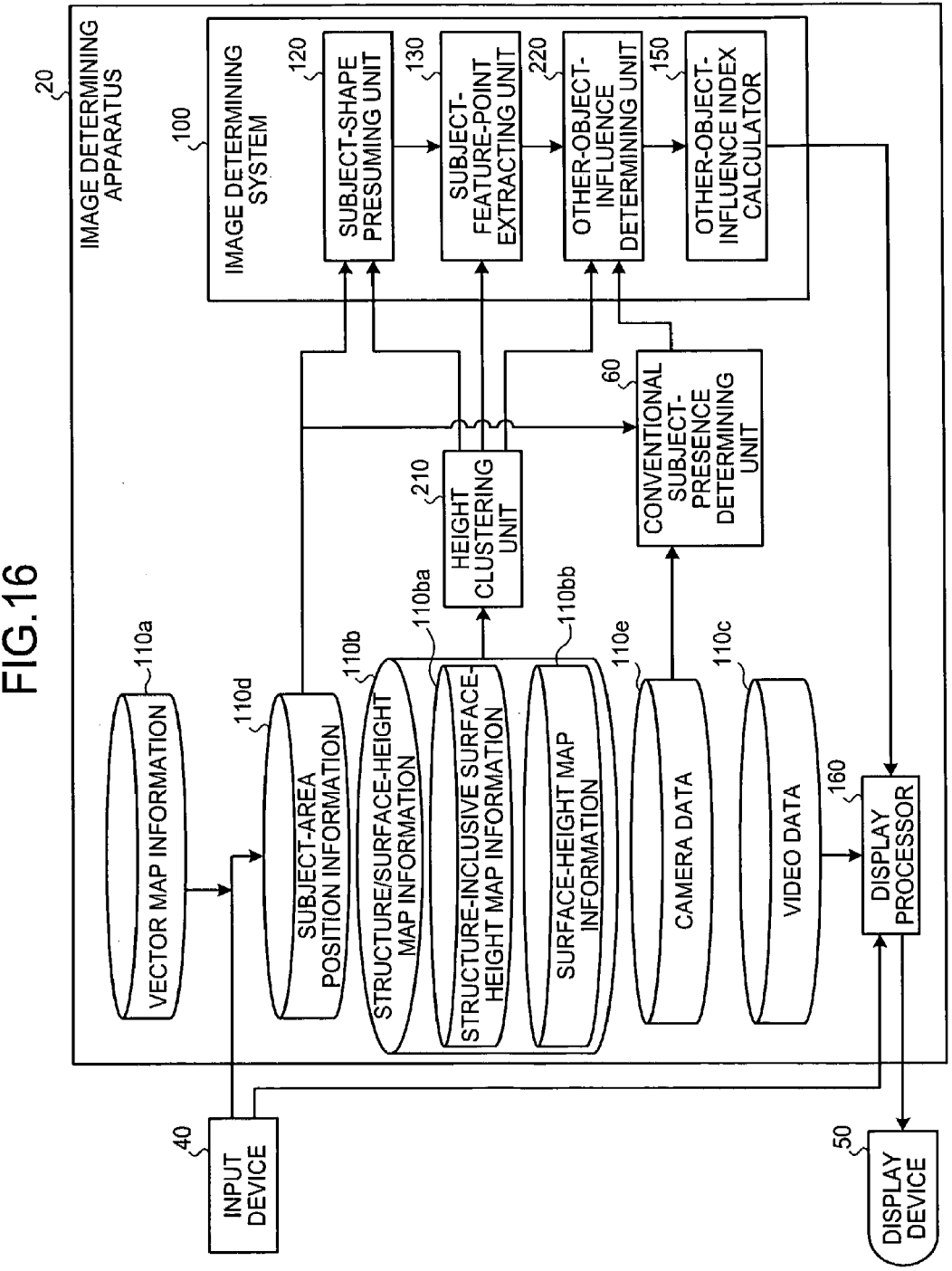
FIG. 16 is a functional block diagram of the configuration of an image determining apparatus according to a second embodiment of the present invention.

FIG. 16 is a functional block diagram of the configuration of an image determining apparatus 20 according to the second embodiment. As shown in FIG. 16, the image determining apparatus 20 includes a height clustering unit 210 and an other-object-influence determining unit 220 having a different internal operation. Because other configurations and operations are the same as those of the image determining apparatus 10 according to the first embodiment, like reference numerals are designated to like parts and explanations thereof will not be repeated.

Figure 17:
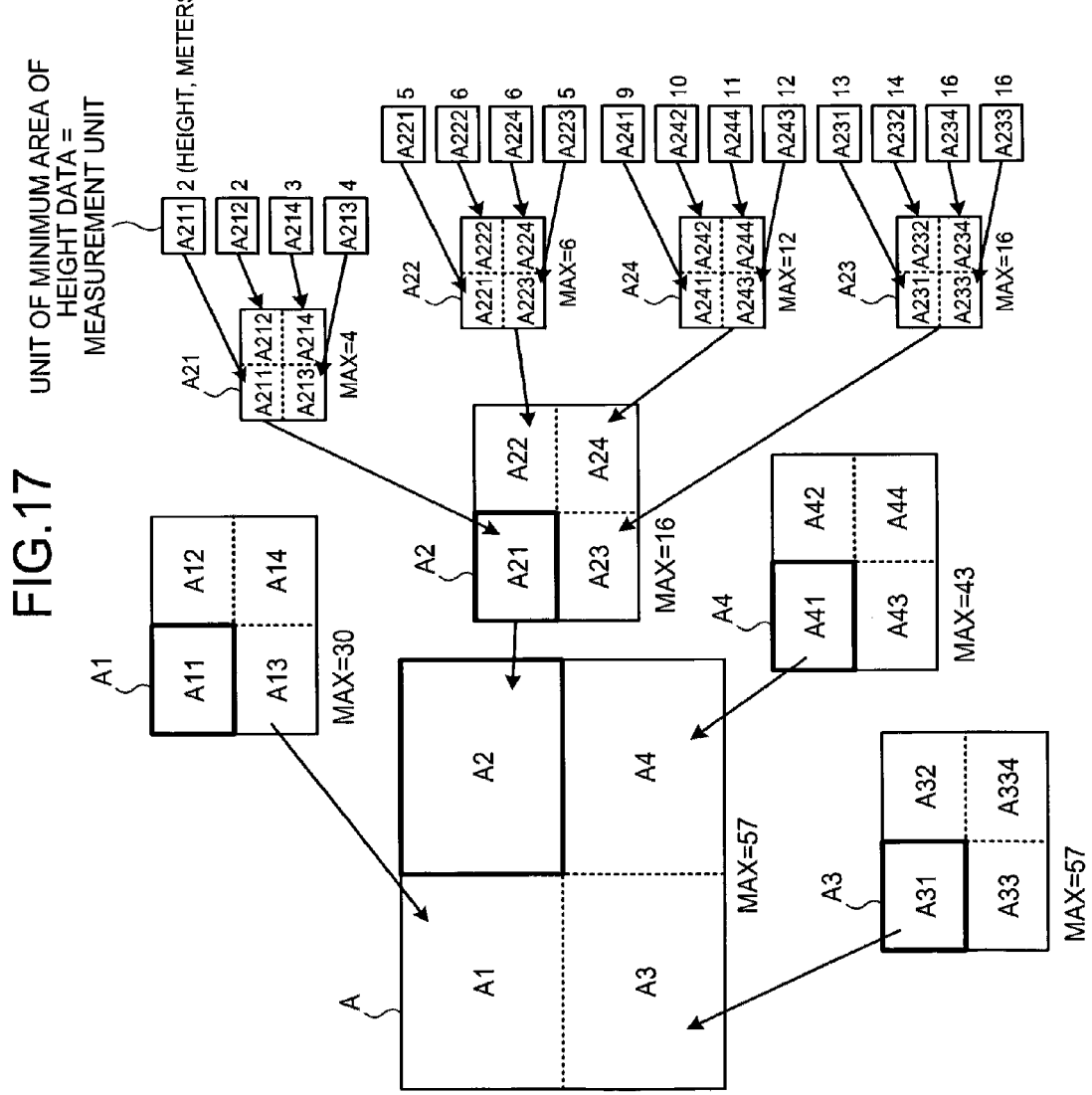
FIG. 17 is a schematic diagram for explaining clustering information calculated by a height clustering unit.

The height clustering unit 210 specifies the maximum height and the minimum height of the height group included in the map for each predetermined area based on the structure/surface-height map information 110b (hereinafter, specified information is described as clustering information). FIG. 17 is a schematic diagram for explaining the clustering information calculated by the height clustering unit 210.

As shown in FIG. 17, a case that the information of the structure/surface-height map information 110b includes height data for each unit of minimum area, which is a height measurement unit, is considered. The height clustering unit 210 integrates four minimum area units adjacent to each other to create an integrated area, and compares the heights of the four minimum area units to specify the maximum height of the integrated area. In an example in FIG. 17, minimum area units A211 to A214 having the height from 2 meters to 4 meters are integrated to form an area of A21, and the maximum height is specified as 4 meters. Likewise, three areas are created, namely, A22 in which the minimum area units A221 to A224 having the height from 5 meters to 6 meters are integrated, A23 in which the minimum area units A231 to A234 having the height from 9 meters to 12 meters are integrated, and A24 in which the minimum area units A241 to A244 having the height from 13 meters to 16 meters are integrated are created, and the maximum height of each area is specified (6 meters, 12 meters, and 16 meters).

The height clustering unit 210 creates a new area A2 by integrating four adjacent areas A21 to A24, and compares the maximum heights of the areas A21 to A24 with each other to specify the maximum height (16 meters) of area A2. In an example shown in FIG. 17, predetermined areas A1, A3, and A4 are created in the same manner, and the maximum height of each area is specified.

The height clustering unit 210 repetitively performs the area integration and the maximum height specification until the area of the integrated area becomes equal to or larger than a specified area or an integrated hierarchy resulting from the clustering becomes equal to or higher than a specified hierarchy. The height clustering unit 210 passes the calculated clustering information to the other-object-influence determining unit 220.

In the second embodiment, an example is explained in which the height clustering unit 210 integrates the four adjacent small areas to create one big area, however, the number of small areas to be integrated is not limited to four, and on the contrary, the big area can be divided to create small areas. The area may not uniformly integrated, and the number of hierarchical levels or the number of integrated areas can be changed according to whether the area is a city area having many retrieval applications or whether the area has extreme changes in difference of elevation. Because the clustering process performed by the height clustering unit 210 can be performed independently of the subject to be determined, the process may not be performed every time, and the clustered data may be held and used as the structure/surface-height map information 110b.

The other-object-influence determining unit 220 creates the number information of the feature points A, B, and C based on the feature points extracted by the subject-feature-point extracting unit 130 and the clustering information.

Figure 18:
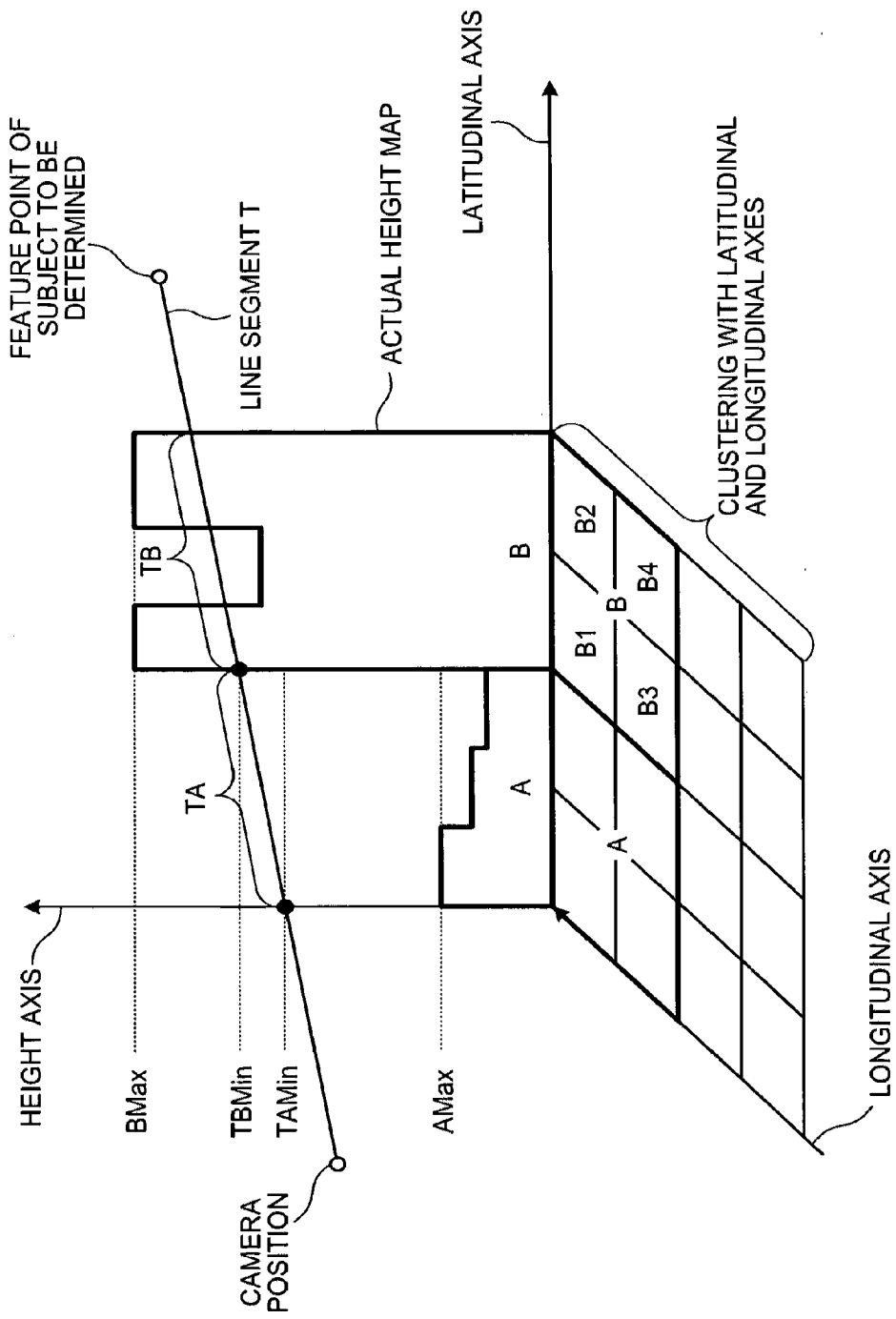
FIG. 18 is a schematic diagram for explaining a process for creating number information based on a feature point and the clustering information.

FIG. 18 is a schematic diagram for explaining the process for creating the number information based on the feature points and the clustering information. In FIG. 18, a case where a line segment T from the camera position to the subject to be determined extends along the latitude is explained. As shown in FIG. 18, a case where clustered areas A and B are included between the camera position and the subject to be determined is explained.

The other-object-influence determining unit 220 divides the line segment T in two along areas A and B and designates the divided line segments as TA and TB. The other-object-influence determining unit 220 compares minimum heights TAMin and TBMin of the respective divided line segments TA and TB with maximum heights AMax and BMax in areas A and B.

When the line segments are higher than the areas A and B, in other words, when TAMin>AMax and TBMin>BMax, the other-object-influence determining unit 220 determines the feature point corresponding to the line segment as feature point A. This is because line segment T is higher than the heights of all objects present in the areas A and B.

On the other hand, when the height of the line segment is equal to or lower than the height of the area A or B, in other words, when TAMin≦AMax or TBMin≦BMax (in the example shown in FIG. 17, TBMin≦BMax), the other-object-influence determining unit 220 uses a corresponding area in the area B (any one area of B1 to B4) to compare the line segment T with the height of the object included in the corresponding area.

For example, when the line segment T corresponds to the areas B1 and B2 (when the line segment T passes on the areas B1 and B2), the other-object-influence determining unit 220 determines whether there is an object higher than the line segment T according to the above method. A case where B1 and B2 are the minimum area units is explained below. When there is no object higher than the line segment T in the areas B1 and B2, the other-object-influence determining unit 220 determines the feature point corresponding to the line segment T as feature point A.

On the other hand, when there is an object higher than the line segment T in the area B1 or B2, the other-object-influence determining unit 220 determines the feature point corresponding to the line segment T as feature point B or C. When the area corresponds to the subject to be determined, the feature point is feature point C, and when the area does not correspond to the subject to be determined, the feature point is feature point B.

The other-object-influence determining unit 220 classifies the feature points of the subject to be determined into feature points A, B, and C according to the above method, and passes the classified information as the number information to the other-object-influence index calculator 150.

Because the other-object-influence determining unit 220 compares the detailed height for each detailed area unit of the lower part and for each measurement point with the height of the line segment based on the clustering information only when necessary, a burden involved with the other-object-influence determination process can be reduced.

In the image determining apparatus 20 according to the second embodiment, because the height clustering unit 210 creates the clustering information in which the height of the highest object among all the objects is specified for each predetermined area based on the structure/surface-height map information 110*b*, and the other-object-influence determining unit 220 uses the clustering information to create the number information of the group of feature points, the optimum video picture data can be efficiently selected.

When creating the integrated area, the height clustering unit 210 may calculate and use the minimum height of each integrated area together with the maximum height. In the method in which only the structure-inclusive surface-height map information 110*ba* in the structure/surface-height map information 110*b* is used to replace the surface-height map information 110*bb*, the method for calculating the height of the lower face of the subject, that is, the height of the contact surface with the ground can be performed more easily by using the minimum height of each integrated area obtained by the clustering. More specifically, in the method according to the first embodiment of the present invention as explained above, an area sufficiently larger than the area of the subject to be determined is checked in the structure-inclusive surface-height map information 110*ba* and the minimum height thereof is calculated, and the minimum height is regarded as the pseudo height of the ground surface of the whole area. The minimum height of the pertinent area can be efficiently calculated, when the group of integrated areas covering the pertinent area is found according to the clustering based on the position of the pertinent area, and the minimum height of each integrated area is compared with each other.

Third Embodiment

Figure 19:
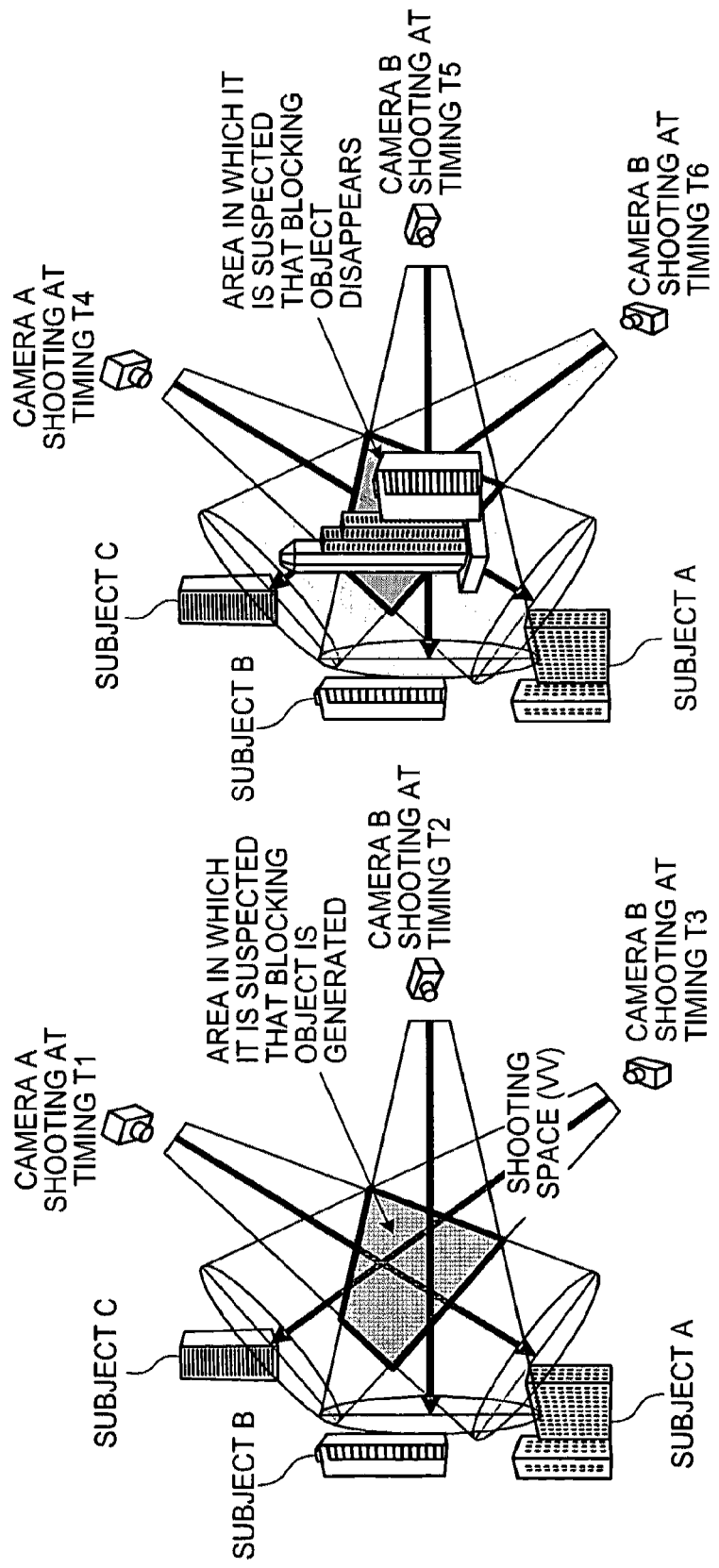
FIG. 19 is a schematic diagram for explaining the concept of an image determining apparatus according to a third embodiment of the present invention.

An apparatus (an image determining apparatus) including the image determining system according to a third embodiment of the present invention is explained next. FIG. 19 is a schematic diagram for explaining the concept of the image determining apparatus according to the third embodiment. As shown on the left side in FIG. 19, subject A is shot by camera A at timing T1, subject B is shot by camera B at timing T2, and subject C is shot by camera C at timing T3. When the user determines that the pictured statuses of all pieces of the video data are poor even when the image determining apparatus determines that the pictured statuses of all pieces of the video data are good (in other words, when the other-object-influence index is equal to or less than the predetermined value), the image determining apparatus determines that a blocking object is generated in an area where the shooting areas of the cameras A, B, and C overlap, and corrects the structure/surface-height map information and the like.

As shown on the right side in FIG. 19, subject A is shot at timing T4, subject B is shot at timing T5, and subject C is shot at timing T6. When the user determines that the pictured statuses of all pieces of the video data are good even when the image determining apparatus determines that the pictured statuses of all piece of video data are poor (in other words, when the other-object-influence index is higher than the predetermined value), the image determining apparatus determines that a blocking object used to be present in an area where the shooting areas of the cameras A, B, and C overlap has disappeared, and corrects the structure/surface-height map information and the like.

Thus, reliability of the other-object-influence index can be improved, because the image determining apparatus according to the third embodiment corrects the structure/surface-height map information and the like based on a response of the user regarding the other-object-influence index. Further, the cost can be largely reduced because the structure/surface-height map information need not to be updated regularly.

Figure 20:
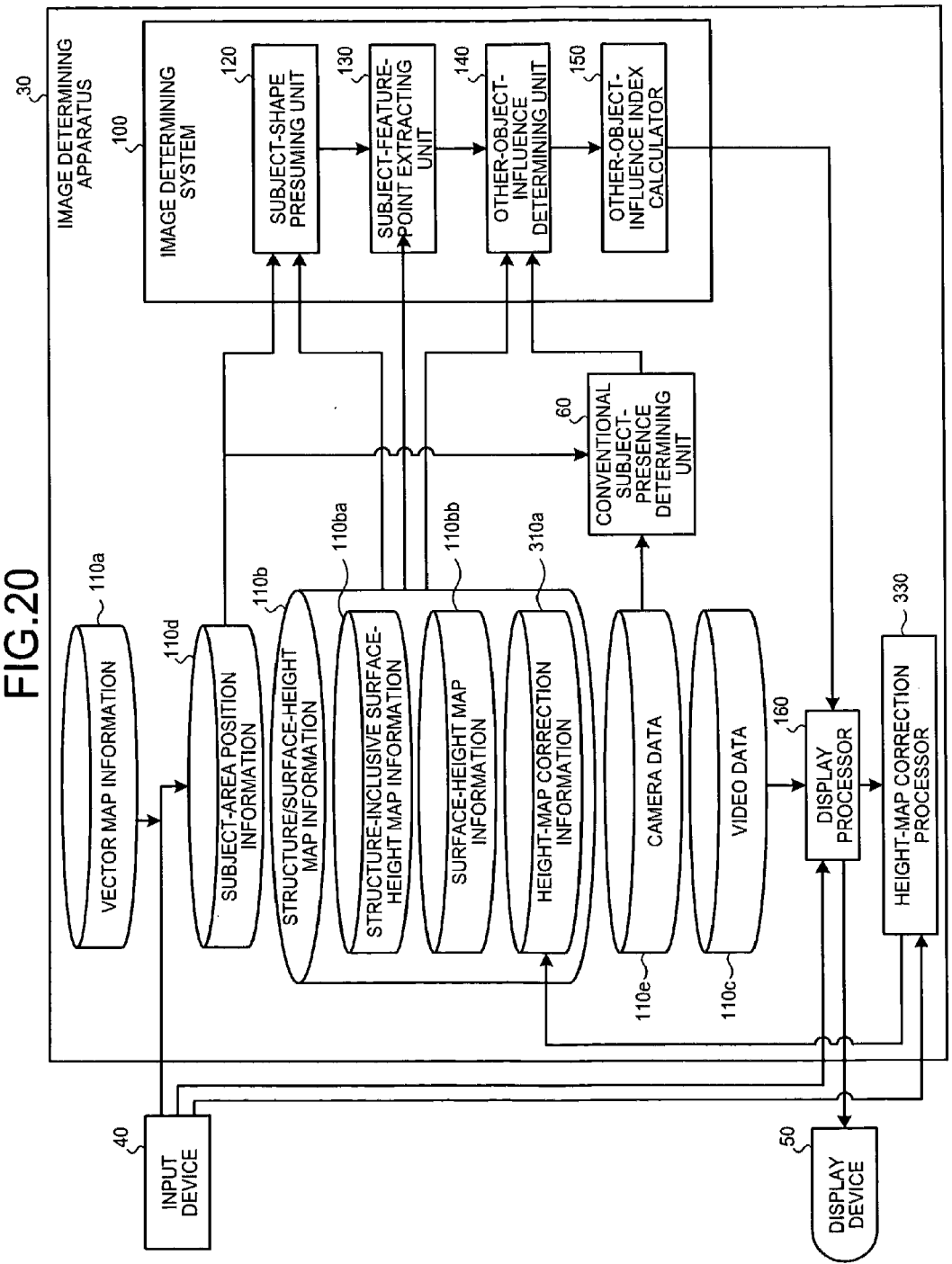
FIG. 20 is a functional block diagram of the configuration of the image determining apparatus according to the third embodiment.
Figure 22:
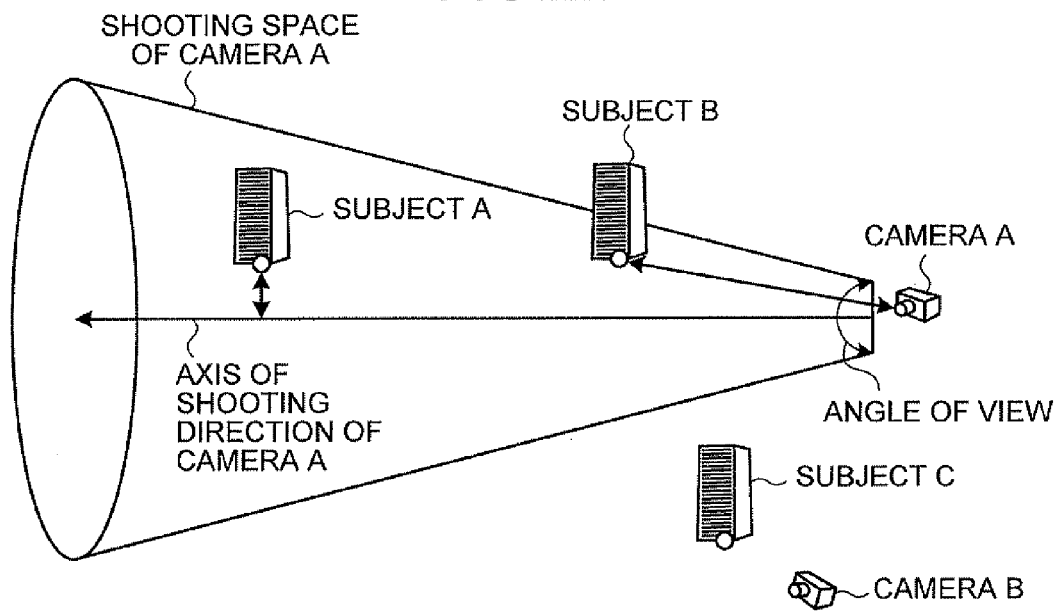
FIG. 22 is a schematic diagram for explaining a conventional technique.
Figure 23:
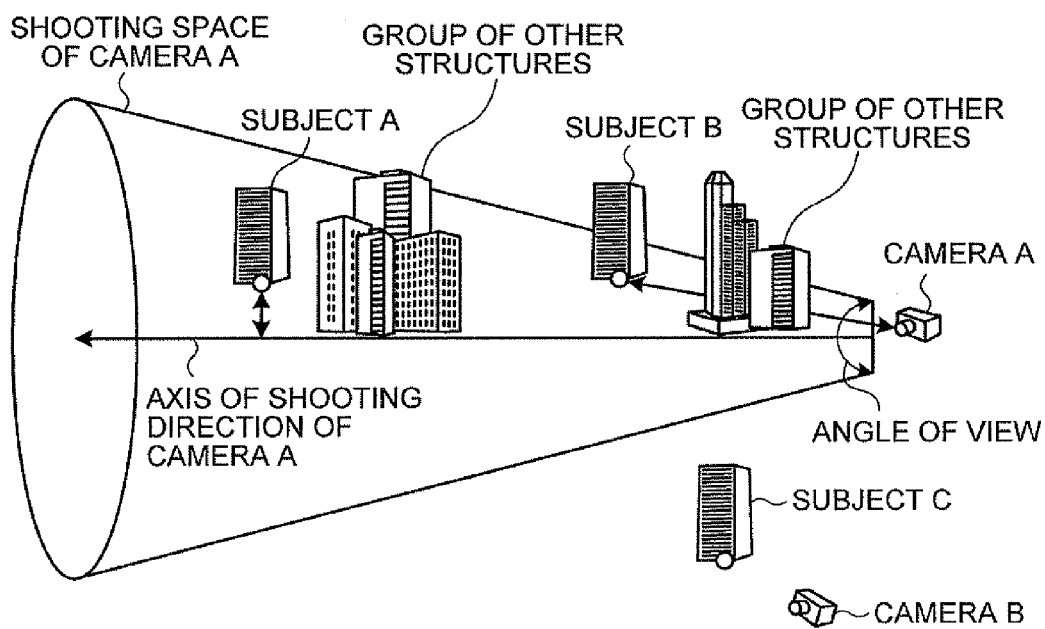
FIG. 23 is a schematic diagram for explaining a problem in the conventional technique.

FIG. 20 is a functional block diagram of the configuration of an image determining apparatus 30 according to the third embodiment. As shown in FIG. 20, the image determining apparatus 30 includes a height-map correction processor 330 and height-map correction information 310*a* as information relating to the structure/surface-height map information 110*b*. Because other configurations and operations are the same as those of the image determining apparatus 10 according to the first embodiment, like reference numerals are designated to like parts and explanations thereof will not be repeated.

The structure/surface-height map information 110b includes the height-map correction information 310a as information relating thereto. Because the explanation of the structure-inclusive surface-height map information 110ba and the surface-height map information 110bb, which are examples of the structure/surface-height map information, is the same as in the first embodiment, the explanation thereof is not repeated. In the third embodiment, the height-map correction information 310a is shown as a part of the structure/surface-height map information 110b by way of example. However, the height-map correction information 310a can be independently held as separate information, as long as inter-correspondence can be maintained.

The height-map correction information 310a is the height information particularly related to the structure in the structure/surface-height map information 110b. Here, the height-map correction information 310a is correction information related with the structure-inclusive surface-height map information 110ba. FIG. 21 is an example of a data structure of the height-map correction information 310a. As shown in FIG. 21, the height-map correction information 310a includes a corrected area table, a corrected-area shape table, and a corrected-area vertex table.

The corrected area table includes "ID", "type", "estimated time of change (MIN)", "estimated time of change (MAX)", "estimated shape ID", "MBR (MIN) latitude and longitude", "MBR (MAX) latitude and longitude", and "assigned three-dimensional mesh ID".

The "ID (identification)" is information for identifying a corrected data area, and the "type" is information indicating whether an area (structure) of a certain height is found to have disappeared based on an error that the height of the corrected data area is too high, or an area (structure) of a certain height is found to have been generated based on an error that the height of the corrected data area is too low. The "estimated time of change (MIN)" and the "estimated time of change (MAX)" indicate the timing the structure changes (i.e., disappeared or generated).

The "estimated shape ID" is information for specifying the corresponding information in the corrected area shape table, the "MBR (MIN) latitude and longitude" and the "MBR (MAX) latitude and longitude" are information of an area where the structure is present, and the "assigned three-dimensional mesh ID" is information for identifying an assigned three-dimensional mesh code.

Moving to the explanation of the corrected area shape table, the corrected area shape data includes "ID", "estimated height (MAX)", "estimated height (MIN)", "number of vertexes of projected shape", and "vertex ID group of projected shape". The "ID" is identification information for associating the area with the "estimated shape ID" in the corrected area table, and the "estimated height (MAX)" and the "estimated height (MIN)" are information of the estimated height of the subject.

The information of the maximum height in the area is stored in the "estimated height (MAX)" when it is determined that the structure has been disappeared, and the information of the minimum height in the area is stored in the "estimated height (MIN)" when it is determined that the structure has been generated. The "number of vertexes of projected shape" indicates the number of vertexes of the structure included in the area or the area shape, and the "vertex ID group of projected shape" is information for identifying each vertex.

The corrected-area vertex table includes the latitude and longitude information of the vertex involved with the estimated shape of the structure, and includes "ID", "latitude", and "longitude". The "ID" is information for associating the area with each ID in the "vertex ID group of projected shape" in the corrected-area shape table. The "latitude" and the "longitude" are information of the latitude and the longitude, respectively.

When the subject-shape presuming unit 120 calculates the heights of the upper face and the lower contact surface of the area of the subject to be determined, or when the subject-feature-point extracting unit 130 calculates the height of the feature point for extracting the feature point of the subject to be determined, or when the other-object-influence determining unit 140 searches for a point higher than the line segment connecting the camera and the feature point, the structure-inclusive surface-height map information 110ba in the structure/surface-height map information 110b is used. At that time, the height-map correction information 310a is compared with the structure-inclusive surface-height map information 110ba. If information of the predetermined area has been corrected in the height-map correction information 310a, the information included in the height-map correction information 310a is given priority.

The height-map correction processor 330 receives a response regarding the other-object influence index of the video data displayed by the display processor 160, and generates and updates the height-map correction information 310a in response to the received response.

Specifically, when obtaining information (response) indicating that the other-object influence index of the video data displayed by the display processor 160 is incorrect from the input device 40, the height-map correction processor 330 determines that the structure/surface-height map information 110b of the area between the position of the camera that has shot the video data and the subject to be determined has changed.

For example, as illustrated in the left side in FIG. 19, when the height-map correction processor 330 can specify to some extent an area in which it is suspected that a blocking object has been generated, the height-map correction processor 330 writes the information of the area in the height-map correction information 310a. In this case, the height-map correction processor 330 sets the "type" to "generated", and registers the estimated area in the "MBR (MIN) latitude and longitude" and the "MBR (MAX) latitude and longitude".

With respect to the time period in which the change is supposed to occur, in the example shown on the left side in FIG. 19 the change is estimated to have happened during a period from timing T1 to timing T3. Therefore, the height-map correction processor 330 registers timing T1 in the "estimated time of change (MIN)" and registers timing T3 in the "estimated time of change (MAX)" (in the case of T1<T2<T3).

As illustrated in the right side in FIG. 19, when the height-map correction processor 330 can specify to some extent an area in which it is suspected that a blocking object has disappeared, the height-map correction processor 330 writes the information of the area in the height-map correction information 310a. In this case, the height-map correction processor 330 sets the "type" to "disappeared", and registers the estimated area in the "MBR (MIN) latitude and longitude" and the "MBR (MAX) latitude and longitude".

Further, with respect to the period when the change is estimated to occur, in the example shown on the right side in FIG. 19, the change can be estimated to have occurred during the period from timing T4 to timing T6. Therefore, the height-map correction processor 330 registers timing T4 in the "estimated time of change (MIN)" and registers timing T6 in the "estimated time of change (MAX)" (in the case of T4<T5<T6).

As described above, in the image determining apparatus 30 according to the third embodiment, the height-map correction processor 330 receives a response regarding the other-object influence index of the video data displayed by the display processor 160 from the input device 40, and generates and updates the height-map correction information 310a when the response includes information indicating that the other-object influence index is incorrect. Accordingly, because the structure/surface-height map information need not be regularly updated and held, the cost can be largely reduced.

In the third embodiment, a case where one complete blocking object is newly generated or disappeared has been explained. However, in an actual case, a part of the blocked subject may become visible or concealed due to reconstruction or the like of the structure. In this case, it is possible to estimate the change in height of the pertinent area to some extent by examining the determination process in detail, for example, by checking which determination on which part of the group of feature points was wrong in determining that the part is covered, rather than by checking the area where the shooting spaces overlap, finding an area where the line segments connecting the feature points and the cameras overlap, and examining in detail whether the area is supposed to be higher or lower than the line segment used in the calculation of the area.

According to the present invention, even when there is another object between the camera and a predetermined subject, optimum image data with a good pictured status can be selected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image determining method for determining a pictured status of a predetermined subject in an image shot by a camera, comprising:
    extracting a plurality of feature points characterizing a position of the subject based on information on an area where the subject is present;
    determining, based on a plurality of line segments connecting the plurality of feature points extracted in the extracting and the camera and information on an area where another subject is present, whether the another subject is present on each of the line segments; and
    determining the pictured status of the predetermined subject based on a number of line segments for which it is determined that the another subject is present thereon.

2. The image determining method according to claim 1, further comprising
    calculating height of an object which is highest in each predetermined area based on the information on the area where the subject is present, wherein
    the determining determines the pictured status of the predetermined subject based on the height in each predetermined area calculated in the calculating and the height of the feature point of the predetermined subject.

3. The image determining method according to claim 2, wherein
    the determining determines, when the height of the highest object in the predetermined area is higher than the height of the feature point of the predetermined subject, the pictured status of the predetermined subject by further dividing the predetermined area and based on height of a highest object in each divided area and the height of the feature point of the predetermined subject.

4. The image determining method according to claim 1, wherein
    the extracting extracts the feature point of the predetermined subject by identifying height of a ground surface based on position information and height information of the subject, and based on the position information and the height information of the subject and the height of the ground surface.

5. The image determining method according to claim 1, wherein
    the extracting extracts the feature point of the predetermined subject by specifying the position of the subject based on height information of each point, and based on the height information of each point and the position of the subject.

6. The image determining method according to claim 1, further comprising
    correcting map information on receiving a response from outside relating to determination result obtained in the determining when the response includes information indicating that the determination result is incorrect.

7. An image determining apparatus for determining a pictured status of a predetermined subject in an image shot by a camera, comprising:
    an extracting unit that extracts a plurality of feature points characterizing a position of the subject based on information on an area where the subject is present; and
    a determining unit that
        (i) determines, based on a plurality of line segments connecting the Plurality of feature points extracted by the extracting unit and the camera and information on an area where another subject is present, whether the another subject is present on each of the line segments, and
        (ii) determines the pictured status of the predetermined subject based on a number of line segments for which it is determined that the another subject is present thereon.

8. The image determining apparatus according to claim 7, further comprising
    a height calculating unit that calculates height of an object which is highest in each predetermined area based on the information on the area where the subject is present, wherein
    the determining unit determines the pictured status of the predetermined subject based on the height in each predetermined area calculated by the height calculating unit and the height of the feature point of the predetermined subject.

9. A non-transitory computer-readable recording medium that stores therein a computer program for determining a pictured status of a predetermined subject in an image shot by a camera, the computer program causing a computer to execute:
    extracting a plurality of feature points characterizing a position of the subject based on information on an area where the subject is present;
    determining, based on a plurality of line segments connecting the plurality of feature points extracted in the extracting and the camera and information on an area where another subject is present, whether the another subject is present on each of the line segments; and determining the pictured status of the predetermined subject based on a number of line segments for which it is determined that the another subject is present thereon.

10. The non-transitory computer-readable recording medium according to claim 9, further causing the computer to execute calculating height of an object which is highest in each predetermined area based on the information on the area where the subject is present, wherein the determining determines the pictured status of the predetermined subject based on the height in each predetermined area calculated in the calculating and the height of the feature point of the predetermined subject.

* * * * *